US009191922B2

(12) United States Patent
Anchan et al.

(10) Patent No.: US 9,191,922 B2
(45) Date of Patent: Nov. 17, 2015

(54) EVOLVED MULTIMEDIA BROADCAST/MULTICAST SERVICES (EMBMS) CLUSTER MANAGEMENT

(71) Applicant: QUALCOMM Incorporated, San Diego, CA (US)

(72) Inventors: Kirankumar Anchan, San Diego, CA (US); Arvind Vardarajan Santhanam, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 94 days.

(21) Appl. No.: 14/146,567

(22) Filed: Jan. 2, 2014

(65) Prior Publication Data
US 2014/0192697 A1 Jul. 10, 2014

Related U.S. Application Data

(60) Provisional application No. 61/748,956, filed on Jan. 4, 2013.

(51) Int. Cl.
*H04W 4/06* (2009.01)
*H04W 72/00* (2009.01)
*H04L 12/18* (2006.01)
*H04W 76/00* (2009.01)
*H04W 4/08* (2009.01)

(52) U.S. Cl.
CPC ........... *H04W 72/005* (2013.01); *H04L 12/185* (2013.01); *H04W 4/06* (2013.01); *H04W 76/005* (2013.01); *H04W 4/08* (2013.01); *Y02B 60/50* (2013.01)

(58) Field of Classification Search
None
See application file for complete search history.

(56) References Cited

U.S. PATENT DOCUMENTS

| 8,320,292 B2 | 11/2012 | Dorenbosch |
| 2007/0168523 A1* | 7/2007 | Jiang et al. ............ 709/228 |
| 2008/0200198 A1 | 8/2008 | Zhang |
| 2009/0080361 A1* | 3/2009 | Song et al. ............ 370/312 |

(Continued)

FOREIGN PATENT DOCUMENTS

| WO | 2012126827 A1 | 9/2012 |
| WO | 2013101834 A1 | 7/2013 |

OTHER PUBLICATIONS

International Search Report and Written Opinion—PCT/US2014/010227—ISA/EPO—Jun. 2, 2014.

(Continued)

*Primary Examiner* — Brian Roberts
(74) *Attorney, Agent, or Firm* — Muncy, Geissler, Olds & Lowe, P.C.

(57) ABSTRACT

In an embodiment, a server determines a first support state for the group communication session that defines a first set of sectors belonging to a multicast/broadcast single frequency network (MBSFN) area for transmission of the session media for the group communication session via Internet Protocol (IP) multicast. The server then transitions the group communication session from the first support state to a second support state that defines a second set of sectors belonging to the MBSFN area for transmission of the session media for the group communication session via IP multicast. Before the transition, the server delivers the session media to the first set of sectors via IP multicast in accordance with the first support state. After the transition, the server delivers the session media to the second set of sectors via IP multicast in accordance with the second support state.

29 Claims, 20 Drawing Sheets

(56) References Cited

U.S. PATENT DOCUMENTS

| | | |
|---|---|---|
| 2009/0080363 A1 | 3/2009 | Song et al. |
| 2010/0042716 A1 | 2/2010 | Farajidana et al. |
| 2010/0061285 A1* | 3/2010 | Maeda et al. ............... 370/312 |
| 2010/0062784 A1* | 3/2010 | Ornbo et al. ............... 455/452.1 |
| 2010/0105366 A1 | 4/2010 | Zhao et al. |
| 2010/0272004 A1* | 10/2010 | Maeda et al. ............... 370/312 |
| 2010/0322131 A1 | 12/2010 | Song et al. |
| 2011/0128903 A1 | 6/2011 | Futaki et al. |
| 2011/0149831 A1* | 6/2011 | Hyun et al. ............... 370/312 |
| 2011/0182225 A1* | 7/2011 | Song et al. ............... 370/312 |
| 2012/0003969 A1 | 1/2012 | Anderson et al. |
| 2012/0063950 A1 | 3/2012 | Bellot et al. |
| 2012/0176953 A1* | 7/2012 | Chao et al. ............... 370/312 |
| 2012/0236776 A1 | 9/2012 | Zhang et al. |
| 2013/0007287 A1 | 1/2013 | Chu et al. |
| 2013/0136052 A1 | 5/2013 | Santhanam et al. |
| 2014/0177504 A1* | 6/2014 | Sayeed et al. ............... 370/312 |

OTHER PUBLICATIONS

Musikka N., et al., "Ericsson's IP-Based BSS and Radio Network Server", Ericsson Review (Incl. ON), Telefonaktiebolaget L M Ericsson, SE, No. 4, Jan. 1, 2000, pp. 224-233, XP002901766, ISSN: 0014-0171.

Taiwan Search Report—TW103100321—TIPO—Jun. 24, 2015.

* cited by examiner

MBSFN Sector with no UE targets and not a supporting sector

MBSFN Sector

Sector not part of the MBSFN area

MBSFN Sector with no UE targets and not a supporting sector

MBSFN Sector

Sector not part of the MBSFN area

EVOLVED MULTIMEDIA BROADCAST/MULTICAST SERVICES (EMBMS) CLUSTER MANAGEMENT

CLAIM OF PRIORITY UNDER 35 U.S.C. §119

The present Application for Patent claims priority to U.S. Application No. 61/748,956 entitled "EVOLVED MULTIMEDIA BROADCAST/MULTICAST SERVICES (eMBMS) CLUSTER MANAGEMENT", filed Jan. 4, 2013, which is assigned to the assignee hereof and is hereby expressly incorporated by reference herein in its entirety.

FIELD OF DISCLOSURE

Embodiments relate to evolved Multimedia Broadcast/Multicast Services (eMBMS) cluster management.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using either unicast, broadcast, multicast or a combination of each. As the group becomes larger it is generally more efficient to use multicast services. However, for group communication services that require low latency and a short time to establish the group communication, the setup time of conventional multicast channels can be a detriment to system performance.

SUMMARY

In an embodiment, a server determines a first support state for the group communication session that defines a first set of sectors belonging to a multicast/broadcast single frequency network (MBSFN) area for transmission of the session media for the group communication session via Internet Protocol (IP) multicast. The server then transitions the group communication session from the first support state to a second support state that defines a second set of sectors belonging to the MBSFN area for transmission of the session media for the group communication session via IP multicast. Before the transition, the server delivers the session media to the first set of sectors via IP multicast in accordance with the first support state. After the transition, the server delivers the session media to the second set of sectors via IP multicast in accordance with the second support state.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
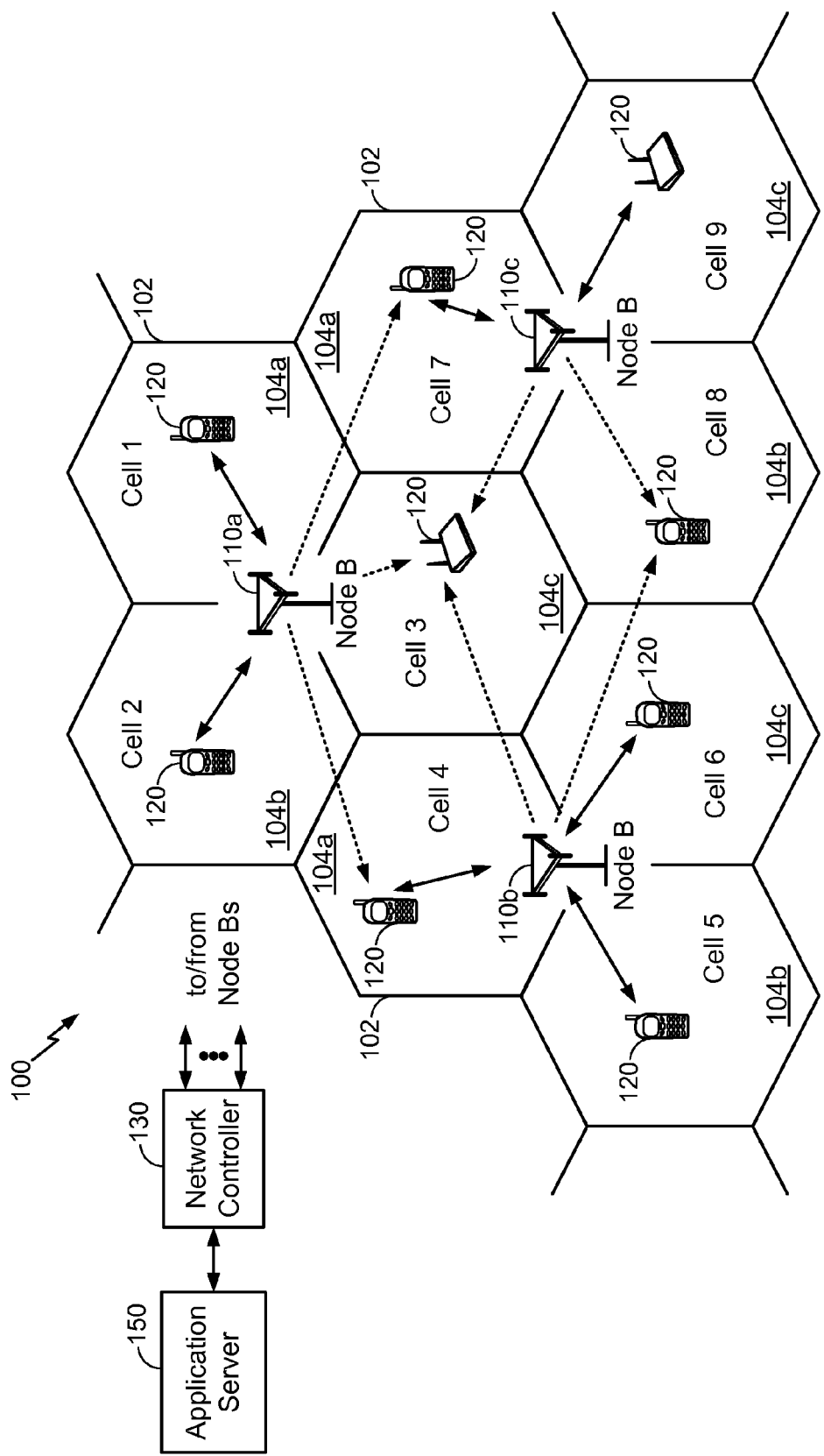
FIG. 1 illustrates a wireless communication system.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. Further, as used herein the term group communication, push-to-talk, or similar variations are meant to refer to a server arbitrated service between two or more devices.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The techniques described herein may be used for various cellular communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a cellular communication system 100, which may be an LTE system. System 100 may include a number of Node Bs and other network entities. For simplicity, only three Node Bs 110a, 110b and 110c are shown in FIG. 1. A Node B may be a fixed station used for communicating with the user equipments (UEs) and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of a cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, e.g., for broadcast and/or multicast services. The terms "UE" and "user" are used interchangeably herein.

Network controller 130 may couple to multiple Node Bs to provide coordination and control for the Node Bs under its control, and to route data for terminals served by these Node Bs. Access network 100 may also include other network entities not shown in FIG. 1. Further, as illustrated network controller may be operably coupled to an application server 150 to provide group communication services to the various UEs 120 through access network 100. It will be appreciated that there can be many other network and system entities that can be used to facilitate communications between the UEs and servers and information outside of the access network. Accordingly, the various embodiments disclosed herein are not limited to the specific arrangement or elements detailed in the various figures.

Figure 2:
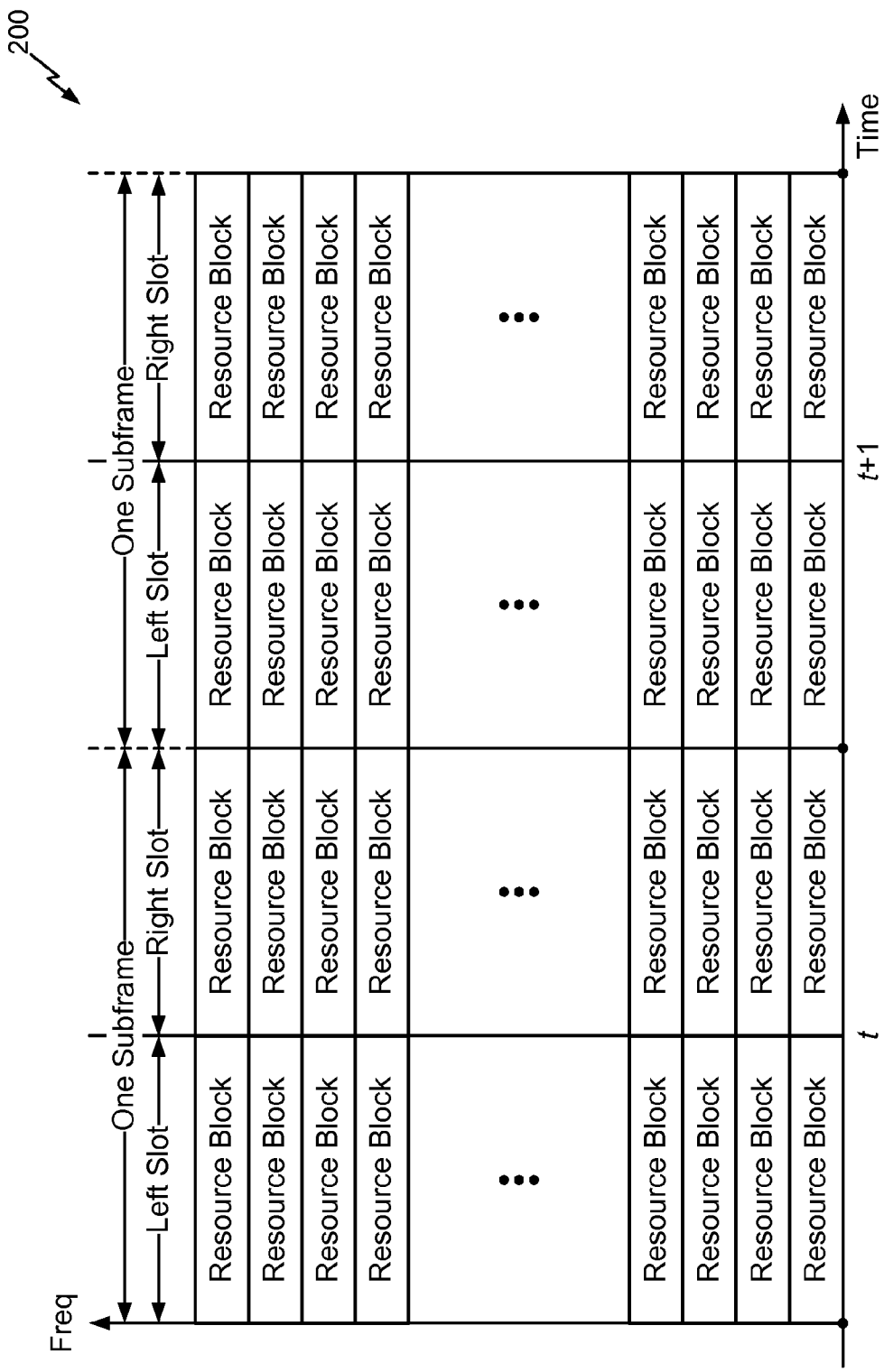
FIG. 2 illustrates an example transmission structure.

FIG. 2 shows an example transmission structure 200 that may be used for the downlink in system 100. The transmission timeline may be partitioned into units of radio frames. Each radio frame may have a predetermined duration (e.g., 10 milliseconds (ms)) and may be partitioned into 10 sub frames. Each sub frame may include two slots, and each slot may include a fixed or configurable number of symbol periods, e.g., six or seven symbol periods.

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (eMBMS) for multiple UEs as well as unicast services for individual UEs. A service for eMBMS may be referred to as an eMBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
|---|---|---|---|
| Broadcast Control Channel | BCCH | L | Carry system information |
| Broadcast Channel | BCH | T | Carry master system Information |
| eMBMS Traffic Channel | MTCH | L | Carry configuration information for eMBMS services. |
| Multicast Channel | MCH | T | Carry the MTCH and MCCH |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
|---|---|---|
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for eMBMS, which may include a multi-cell mode and a single-cell mode. The multi-cell mode may have the following characteristics:
  Content for broadcast or multicast services can be transmitted synchronously across multiple cells.
  Radio resources for broadcast and multicast services are allocated by an MBMS Coordinating Entity (MCE), which may be logically located above the Node Bs.
  Content for broadcast and multicast services is mapped on the MCH at a Node B.
  Time division multiplexing (e.g., at sub frame level) of data for broadcast, multicast, and unicast services.

The single-cell mode may have the following characteristics:
  Each cell transmits content for broadcast and multicast services without synchronization with other cells.
  Radio resources for broadcast and multicast services are allocated by the Node B.
  Content for broadcast and multicast services is mapped on the DL-SCH.
  Data for broadcast, multicast, and unicast services may be multiplexed in any manner allowed by the structure of the DL-SCH.

In general, eMBMS services may be supported with the multi-cell mode, the single-cell mode, and/or other modes. The multi-cell mode may be used for eMBMS multicast/broadcast single frequency network (MBSFN) transmission, which may allow a UE to combine signals received from multiple cells in order to improve reception performance.

Figure 3:
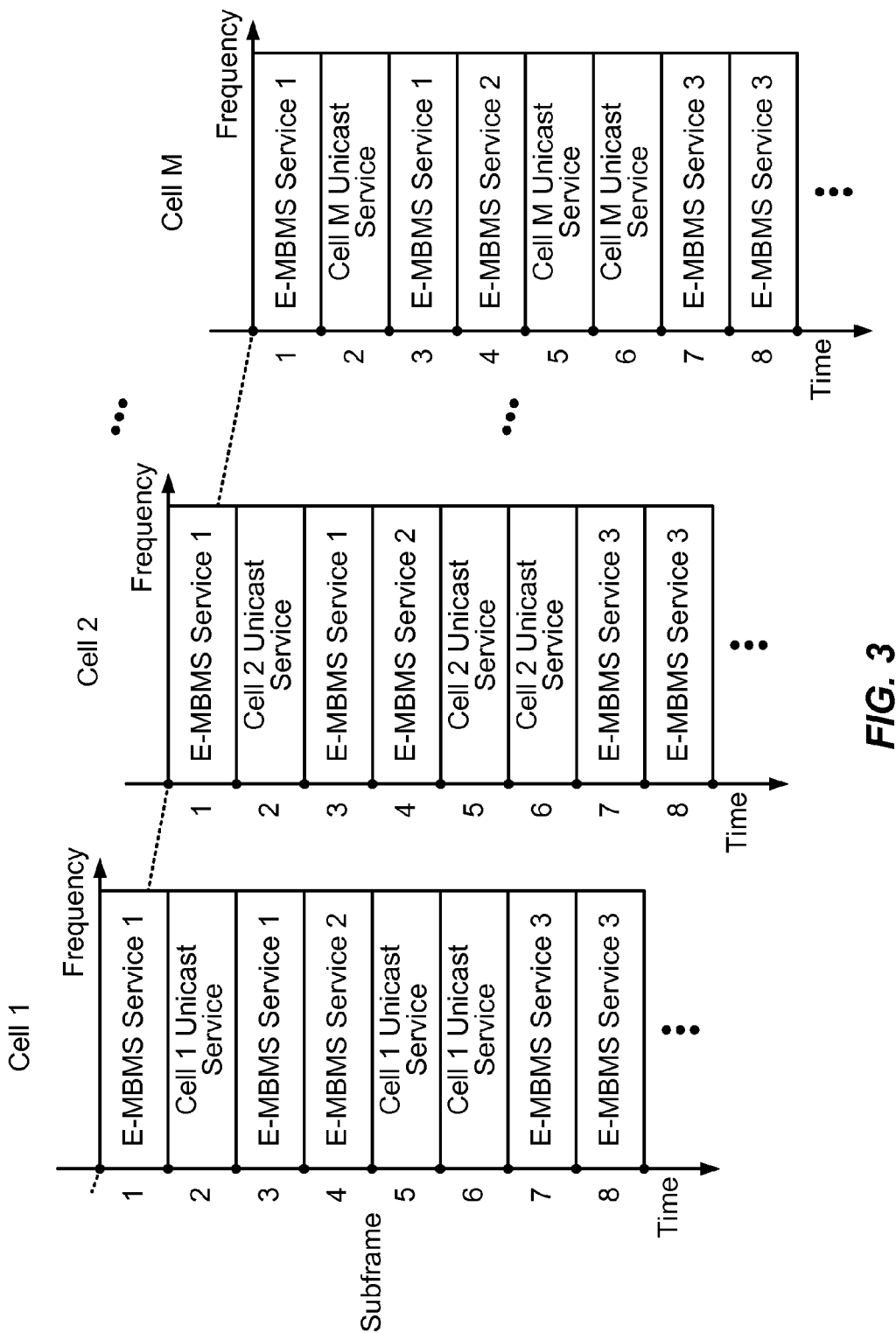
FIG. 3 illustrates example transmissions of different services in a multi-cell mode.

FIG. 3 shows example transmissions of eMBMS and unicast services by M cells 1 through M in the multi-cell mode, where M may be any integer value. For each cell, the horizontal axis may represent time, and the vertical axis may represent frequency. In one design of eMBMS, which is assumed for much of the description below, the transmission time line for each cell may be partitioned into time units of sub frames. In other designs of eMBMS, the transmission time line for each cell may be partitioned into time units of other durations. In general, a time unit may correspond to a sub frame, a slot, a symbol period, multiple symbol periods, multiple slots, multiple sub frames, etc.

In the example shown in FIG. 3, the M cells transmit three eMBMS services 1, 2 and 3. All M cells transmit eMBMS service 1 in sub frames 1 and 3, eMBMS service 2 in sub frame 4, and eMBMS service 3 in sub frames 7 and 8. The M cells transmit the same content for each of the three eMBMS services. Each cell may transmit its own unicast service in sub frames 2, 5 and 6. The M cells may transmit different contents for their unicast services.

Figure 4:
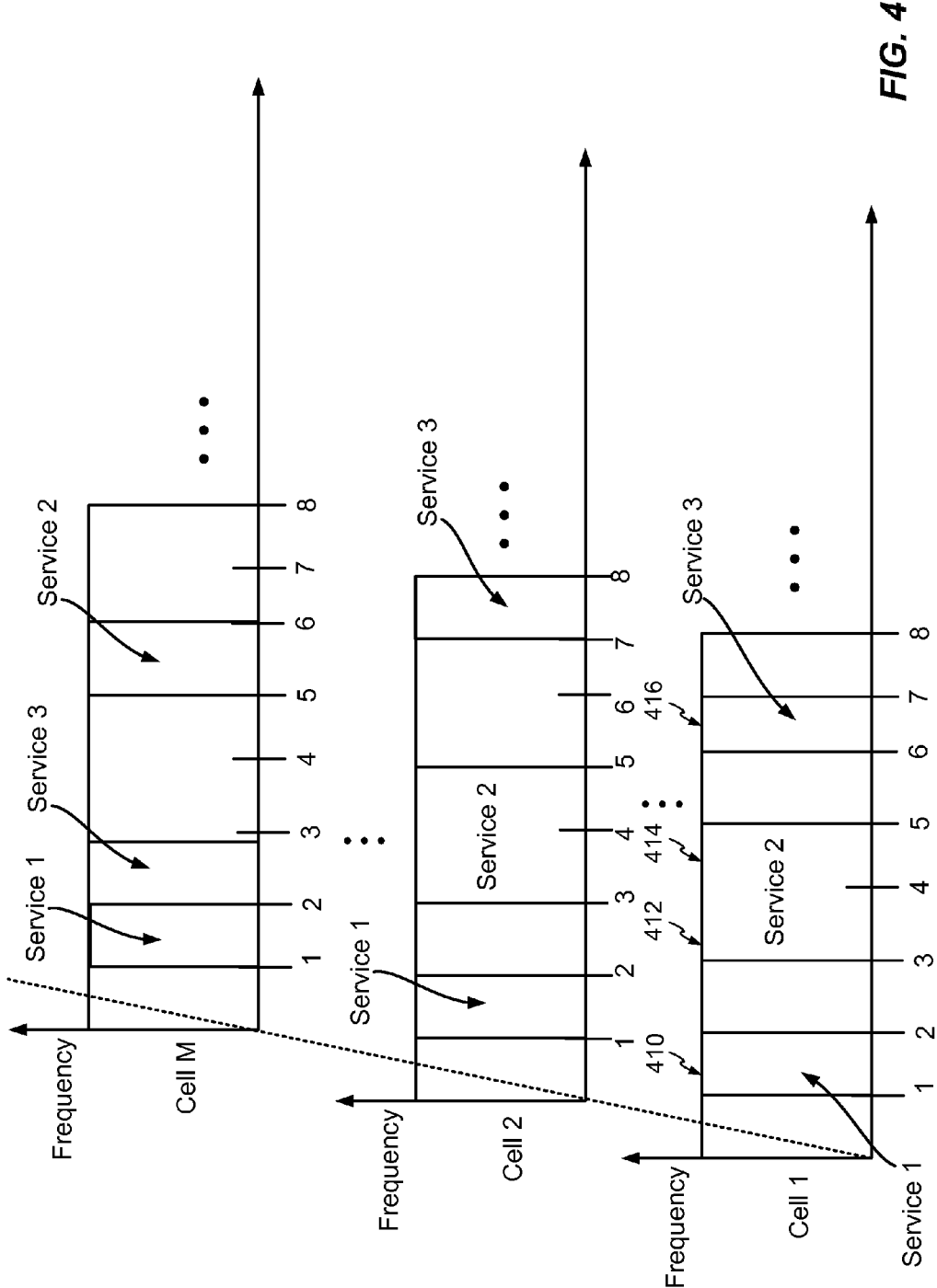
FIG. 4 illustrates example transmissions of different services in a single-cell mode.

FIG. 4 shows example transmissions of eMBMS and unicast services by M cells in the single-cell mode. For each cell, the horizontal axis may represent time, and the vertical axis may represent frequency. In the example shown in FIG. 4, the M cells transmit three eMBMS services 1, 2 and 3. Cell 1 transmits eMBMS service 1 in one time frequency block 410, eMBMS service 2 in time frequency blocks 412 and 414, and eMBMS service 3 in one time frequency blocks 416. Similarly other cells transmit services 1, 2 and 3 as shown in the FIG. 4.

In general, an eMBMS service may be sent in any number of time frequency blocks. The number of sub frames may be dependent on the amount of data to send and possibly other factors. The M cells may transmit the three eMBMS services 1, 2 and 3 in time frequency blocks that may not be aligned in time and frequency, as shown in FIG. 4. Furthermore, the M cells may transmit the same or different contents for the three eMBMS services. Each cell may transmit its own unicast service in remaining time frequency resources not used for the three eMBMS services. The M cells may transmit different contents for their unicast services.

FIGS. 3 and 4 show example designs of transmitting eMBMS services in the multi-cell mode and the single-cell mode. eMBMS services may also be transmitted in other manners in the multi-cell and single-cell modes, e.g., using time division multiplexing (TDM).

As noted in the foregoing, eMBMS services can be used to distribute multicast data to groups and could be useful in group communication systems (e.g., Push-to-Talk (PTT) calls). Conventional applications on eMBMS have a separate service announcement/discovery mechanism. Further, communications on pre-established eMBMS flows are always on even on the air interface. Power saving optimization must be applied to put the UE to sleep when a call/communication is not in progress. This is typically achieved by using out of band service announcements on unicast or multicast user plane data. Alternatively application layer paging channel like mechanism may be used. Since the application layer paging mechanism has to remain active, it consumes bandwidth on the multicast sub-frame which could be idle in the absence of the paging mechanism. Additionally, since the multicast sub-frame will be active while using the application layer paging, the remainder of the resource blocks within the sub frame cannot be used for unicast traffic. Thus the total 5 Mhz bandwidth will be consumed for the sub frame for instances when application layer paging is scheduled without any other data.

Figure 5A:
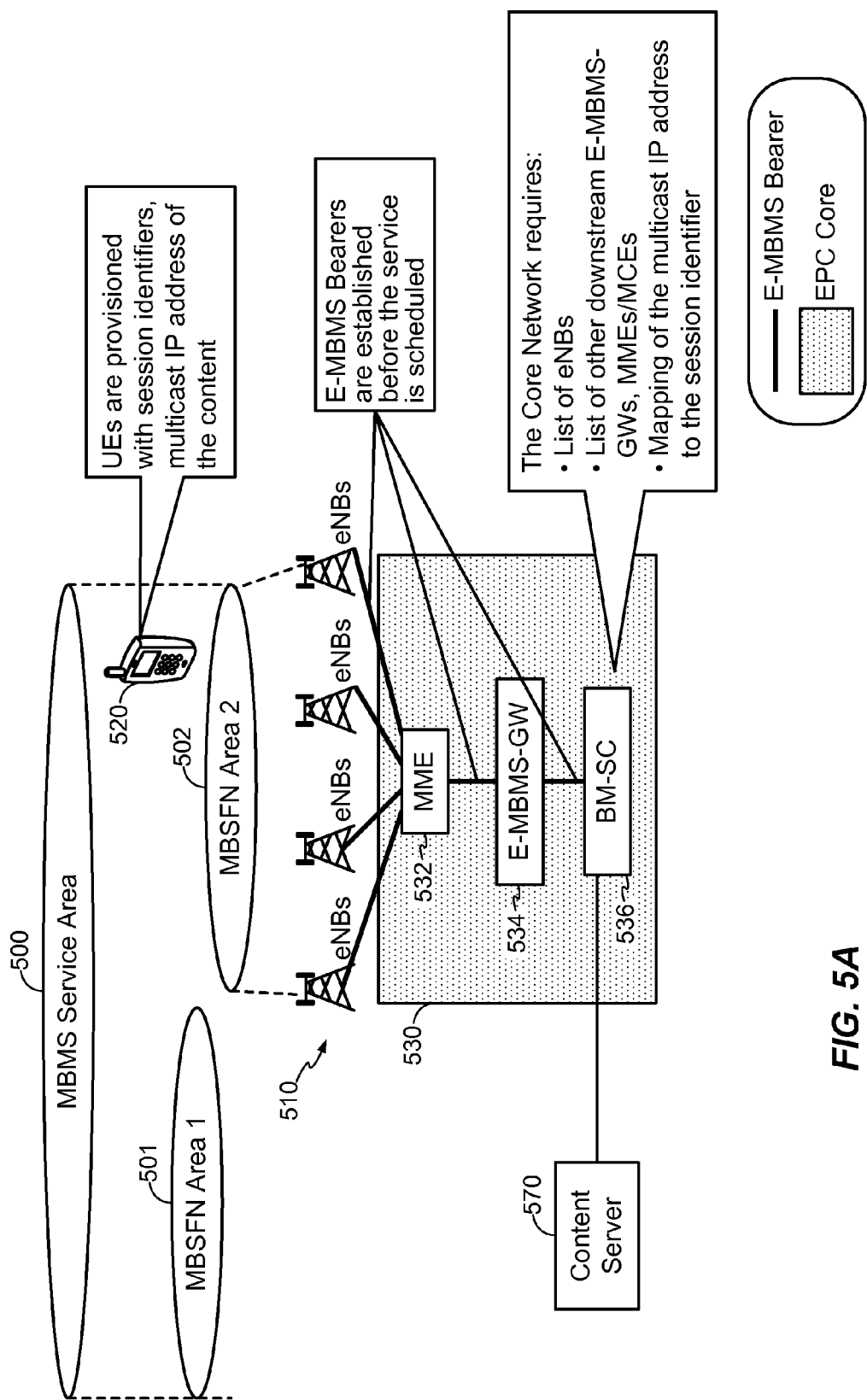
FIGS. 5A and 5B illustrate additional wireless communication systems that can support broadcast/multicast services.

FIG. 5A is another illustration of a wireless network that can implement evolved multimedia broadcast/multicast services (eMBMS) or MBMS services, which are used interchangeably herein. An MBMS service area 500 can include multiple MBSFN areas (e.g. MBSFN area 1, 501 and MBSFN area 2, 502). Each MBSFN area can be supported by one or more eNode Bs 510, which are coupled to a core network 530. Core network 530 can include various elements (e.g., MME 532, eMBMS gateway 534, and broadcast multicast service center (BM-SC) 536 to facilitate controlling and distributing the content from a content provider or server 570 (which may include an application server, etc.) to the MBMS service area 500. The core network 530 may require a list of eNode Bs within the network, list of other downstream E-MBMS-GWs 534, and (Mobility Management Entity) MMEs/MCEs 532, and a mapping of the multicast IP address to the session identifier. UE 520 within the network can be provisioned with session identifiers and multicast IP address of the content sent to it. Typically an MME is a key control node for the LTE access network. It is responsible for idle mode UE tracking and paging procedure including retransmissions. It is involved in the bearer activation/deactivation process and is also responsible for choosing the SGW for a UE at the initial attach and at time of intra-LTE handover involving core network 530 node relocation and the MME is also responsible for authenticating the user. The MME 532 can also check the authorization of the UE to camp on the service provider's Public Land Mobile Network (PLMN) and enforces UE roaming restrictions. The MME 532 is the termination point in the network for ciphering/integrity protection for Non Access Stratum (NAS) signaling and handles the security key management. The MME also provides the control plane function for mobility between LTE and 2G/3G access networks with S3 interface terminating at the MME.

Figure 5B:
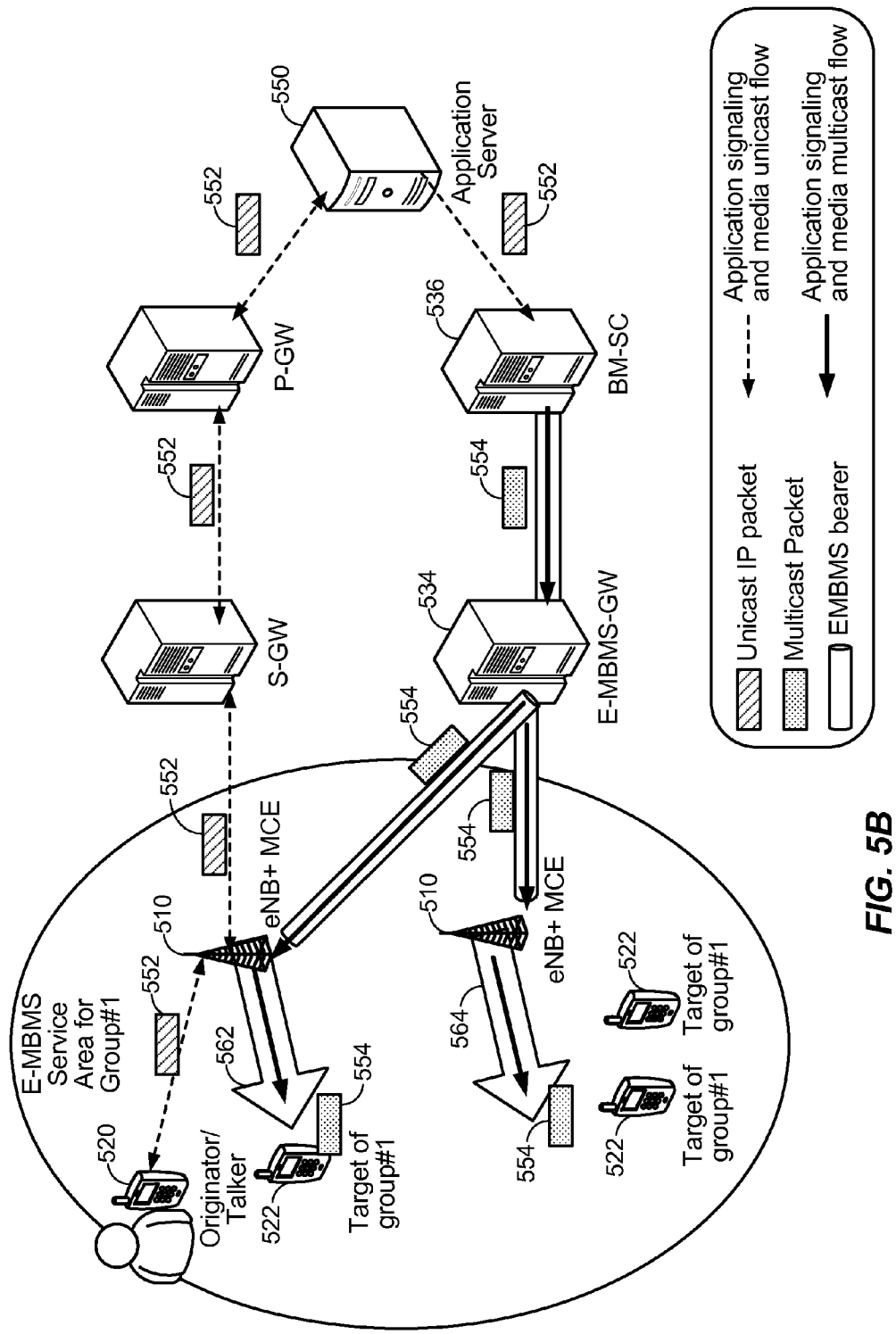

FIG. 5B is another illustration of a wireless network that can implement multimedia broadcast/multicast services (MBMS) as disclosed herein. In the illustrated network an application server 550 (e.g., PTT server) can serve as the content server. The application server 550 can communicate media in unicast packets 552 to the network core where the content can be maintained in a unicast configuration and transmitted as unicast packets to a given UE (e.g., originator/talker 520) or can be converted through the BM-SC to multicast packets 554, which can then be transported target UE's 522. For example, a PTT call can be initiated by UE 520 by communicating with application server 550 via unicast packets 552 over a unicast channel. It will be noted that for the call originator/call talker both the application signaling and media are communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example. Further, it will be appreciated in this example, that both the application signaling and media can be communicated over the multicast flow in the downlink or the forward link. Unlike conventional systems, having both the application signaling and the media in the multicast flow, avoids the need of having a separate unicast channel for the application signaling. However, to allow for application signaling over the multicast flow of the illustrated system, an evolved. packet system (EPS) bearer will be established (and persistently on) between the BM-SC 536, EMBMS GW 534, eNBs 510 and target UEs 522.

In accordance with various embodiments disclosed herein some of the downlink channels related to eMBMS will be further discussed, which include.

MCCH: Multicast Control Channel;
MTCH: Multicast Traffic Channel;
MCH: Multicast Channel; and
PMCH: Physical Multicast Channel.

It will be appreciated that multiplexing of eMBMS and unicast flows are realized in the time domain only. The MCH is transmitted over MBSFN in specific sub frames on physical layer. MCH is a downlink only channel. A single transport block is used per sub frame. Different services (MTCHs) can be multiplexed in this transport block, as will be illustrated in relation to FIG. 6.

To achieve low latency and reduce control signaling, one eMBMS flow (562, 564) can be activated for each service area. Depending on the data rate, multiple multicast flows can be multiplexed on a single slot. PTT UEs (targets) can ignore and "sleep" between scheduled sub frames and reduce power consumption when no unicast data is scheduled for the UE. The MBSFN sub frame can be shared by groups in the same MBSFN service area. MAC layer signaling can be leveraged to "wake-up" the application layer (e.g., PTT application) for the target UEs.

Embodiments can use two broadcast streams, each a separate eMBMS flow over an LTE broadcast flow, with its own application level broadcast stream and its own (multicast IP address) for each defined broadcast region 502, 501 (e.g., a subset of sectors within the network). Although illustrated as separate regions, it will be appreciated that the broadcast areas 502, 501 may overlap.

In LTE, the control and data traffic for multicast is delivered over MCCH and MTCH, respectively. The Medium Access Control Protocol Data Units (MAC PDUs) for the UEs indicate the mapping of the MTCH and the location of the a particular MTCH within a sub frame. An MCH Scheduling Information (MSI) MAC control element is included in the first subframe allocated to the MCH within the MCH scheduling period to indicate the position of each MTCH and unused subframes on the MCH. For eMBMS user data, which is carried by the MTCH logical channel, MCH scheduling information (MSI) periodically provides at lower layers (e.g., MAC layer information) the information on decoding the MTCH. The MSI scheduling can be configured and according to this embodiment is scheduled prior to MTCH sub-frame interval.

Figure 6:
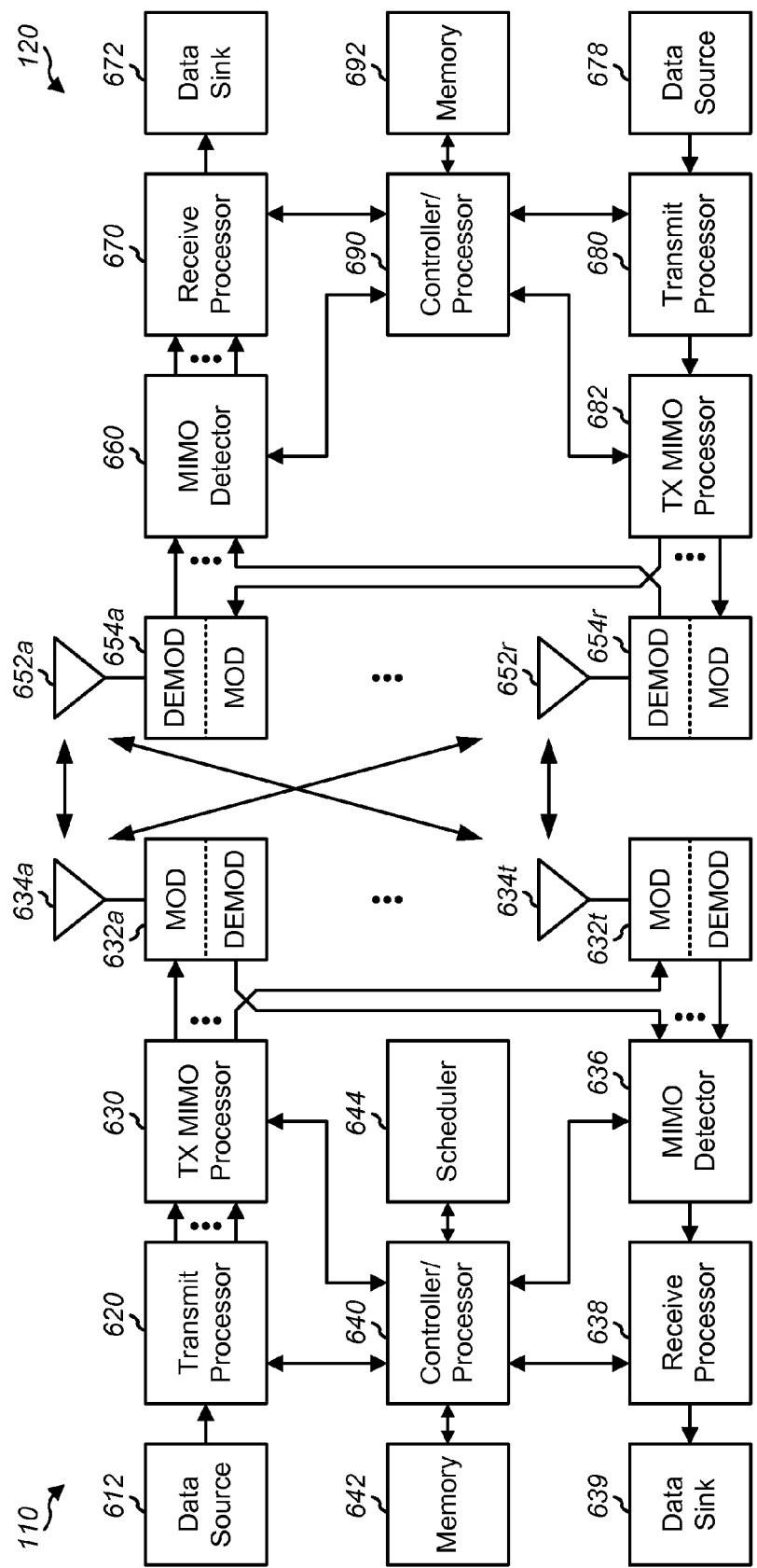
FIG. 6 illustrates a block diagram of a portion of a wireless communication system that can support broadcast/multicast services.

FIG. 6 illustrates a block diagram of a design of an eNode B 110 and UE 120, which may be one of the eNode Bs and one of the UEs discussed herein in relation to the various embodiments. In this design, Node B 110 is equipped with T antennas 634a through 634t, and UE 120 is equipped with R antennas 652a through 652r, where in general T is greater than or equal to 1 and R is greater than or equal to 1.

At Node B 110, a transmit processor 620 may receive data for unicast services and data for broadcast and/or multicast services from a data source 612 (e.g., directly or indirectly from application server 150). Transmit processor 620 may process the data for each service to obtain data symbols. Transmit processor 620 may also receive scheduling information, configuration information, control information, system information and/or other overhead information from a controller/processor 640 and/or a scheduler 644. Transmit processor 620 may process the received overhead information and provide overhead symbols. A transmit (TX) multiple-input multiple-output (MIMO) processor 630 may multiplex the data and overhead symbols with pilot symbols, process (e.g., precode) the multiplexed symbols, and provide T output symbol streams to T modulators (MOD) 632a through 632t. Each modulator 632 may process a respective output symbol stream (e.g., for OFDM) to obtain an output sample stream. Each modulator 632 may further process (e.g., convert to analog, amplify, filter, and upconvert) the output sample stream to obtain a downlink signal. T downlink signals from modulators 632a through 632t may be transmitted via T antennas 634a through 634t, respectively.

At UE 120, antennas 652a through 652r may receive the downlink signals from Node B 110 and provide received signals to demodulators (DEMOD) 654a through 654r, respectively. Each demodulator 654 may condition (e.g., filter, amplify, downconvert, and digitize) a respective received signal to obtain received samples and may further process the received samples (e.g., for OFDM) to obtain received symbols. A MIMO detector 660 may receive and process the received symbols from all R demodulators 654a through 654r and provide detected symbols. A receive processor 670 may process the detected symbols, provide decoded data for UE 120 and/or desired services to a data sink 672, and provide decoded overhead information to a controller/processor 690. In general, the processing by MIMO detector 660 and receive processor 670 is complementary to the processing by TX MIMO processor 630 and transmit processor 620 at Node B 110.

On the uplink, at UE 120, data from a data source 678 and overhead information from a controller/processor 690 may be processed by a transmit processor 680, further processed by a TX MIMO processor 682 (if applicable), conditioned by modulators 654a through 654r, and transmitted via antennas 652a through 652r. At Node B 110, the uplink signals from UE 120 may be received by antennas 634, conditioned by demodulators 632, detected by a MIMO detector 636, and processed by a receive processor 638 to obtain the data and overhead information transmitted by UE 120.

Controllers/processors 640 and 690 may direct the operation at Node B 110 and UE 120, respectively. Scheduler 644 may schedule UEs for downlink and/or uplink transmission, schedule transmission of broadcast and multicast services, and provide assignments of radio resources for the scheduled UEs and services. Controller/processor 640 and/or scheduler 644 may generate scheduling information and/or other overhead information for the broadcast and multicast services.

Controller/processor 690 may implement processes for the techniques described herein. Memories 642 and 692 may store data and program codes for Node B 110 and UE 120, respectively. Accordingly, group communications in the eMBMS environment can be accomplished in accordance with the various embodiments disclosed herein, while still remaining compliant with the existing standards.

Figure 7:
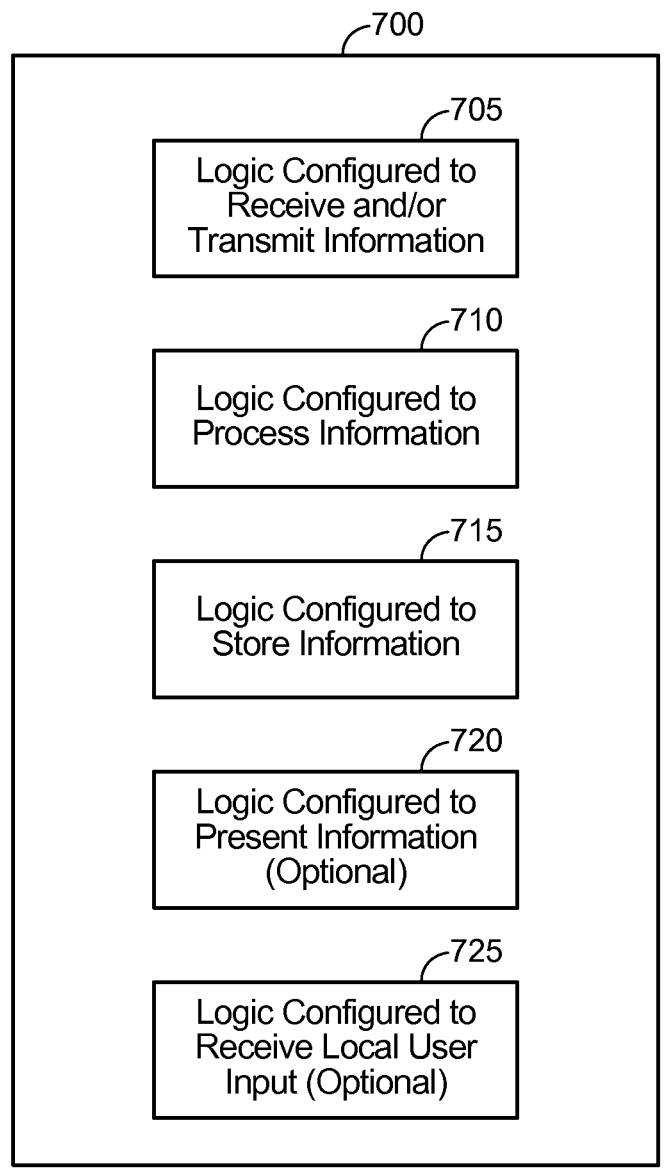
FIG. 7 illustrates a communication device that includes logic configured to receive and/or transmit information.

FIG. 7 illustrates a communication device 700 that includes logic configured to perform functionality. The communication device 700 can correspond to any of the above-noted communication devices, including but not limited to Node Bs 110 or 510, UEs 120 or 520, the application server 150, the network controller 130, the BM-SC 536, the content server 570, MME 532, E-MBMS-GW 532, etc. Thus, communication device 700 can correspond to any electronic device that is configured to communicate with (or facilitate communication with) one or more other entities over a network.

Referring to FIG. 7, the communication device 700 includes logic configured to receive and/or transmit information 705. In an example, if the communication device 700 corresponds to a wireless communications device (e.g., UE 120, Node B 110, etc.), the logic configured to receive and/or transmit information 705 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 705 can correspond to a wired communications interface (e.g., a serial connection, a USB or Firewire connection, an Ethernet connection through which the Internet 175 can be accessed, etc.). Thus, if the communication device 700 corresponds to some type of network-based server (e.g., the application server 150, the network controller 130, the BM-SC 536, the content server 570, MME 532, E-MBMS-GW 532, etc.), the logic configured to receive and/or transmit information 705 can correspond to an Ethernet card, in an example, that connects the network-based server to other communication entities via an Ethernet protocol. In a further example, the logic configured to receive and/or transmit information 705 can include sensory or measurement hardware by which the communication device 700 can monitor its local environment (e.g., an accelerometer, a temperature sensor, a light sensor, an antenna for monitoring local RF signals, etc.). The logic configured to receive and/or transmit information 705 can also include software that, when executed, permits the associated hardware of the logic configured to receive and/or transmit information 705 to perform its reception and/or transmission function(s). However, the logic configured to receive and/or transmit information 705 does not correspond to software alone, and the logic configured to receive and/or transmit information 705 relies at least in part upon hardware to achieve its functionality.

Referring to FIG. 7, the communication device 700 further includes logic configured to process information 710. In an example, the logic configured to process information 710 can include at least a processor. Example implementations of the type of processing that can be performed by the logic configured to process information 710 includes but is not limited to performing determinations, establishing connections, making selections between different information options, performing evaluations related to data, interacting with sensors coupled to the communication device 700 to perform measurement operations, converting information from one format to another (e.g., between different protocols such as .wmv to .avi, etc.), and so on. For example, the processor included in the logic configured to process information 710 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 710 can also include software that, when executed, permits the associated hardware of the logic configured to process information 710 to perform its processing function(s). However, the logic configured to process information 710 does not correspond to software alone, and the logic configured to process information 710 relies at least in part upon hardware to achieve its functionality.

Referring to FIG. 7, the communication device 700 further includes logic configured to store information 715. In an example, the logic configured to store information 715 can include at least a non-transitory memory and associated hardware (e.g., a memory controller, etc.). For example, the non-transitory memory included in the logic configured to store information 715 can correspond to RAM memory, flash memory, ROM memory, EPROM memory, EEPROM memory, registers, hard disk, a removable disk, a CD-ROM, or any other form of storage medium known in the art. The logic configured to store information 715 can also include software that, when executed, permits the associated hardware of the logic configured to store information 715 to perform its storage function(s). However, the logic configured to store information 715 does not correspond to software alone, and the logic configured to store information 715 relies at least in part upon hardware to achieve its functionality.

Referring to FIG. 7, the communication device 700 further optionally includes logic configured to present information 720. In an example, the logic configured to display information 720 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 700. For example, if the communication device 700 corresponds to UE 120 or 520, the logic configured to present information 720 can include a display screen and an audio output device (e.g., speakers). In a further example, the logic configured to present information 720 can be omitted for certain communication devices, such as network communication devices that do not have a local user (e.g., network switches or routers, remote servers, etc.). The logic configured to present information 720 can also include software that, when executed, permits the associated hardware of the logic configured to present information 720 to perform its presentation function(s). However, the logic configured to present information 720 does not correspond to software alone, and the logic configured to present information 720 relies at least in part upon hardware to achieve its functionality.

Referring to FIG. 7, the communication device 700 further optionally includes logic configured to receive local user input 725. In an example, the logic configured to receive local user input 725 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 700. For example, if the communication device 700 corresponds to UE 120 or 520, the logic configured to receive local user input 725 can include a display screen (if implemented a touch-screen), a keypad, etc. In a further example, the logic configured to receive local user input 725 can be omitted for certain communication devices, such as network communication devices that do not have a local user (e.g., network switches or routers, remote servers, etc.). The logic configured to receive local user input 725 can also include software that, when executed, permits the associated hardware of the logic configured to receive local user input 725 to perform its input reception function(s). However, the logic configured to receive local user input 725 does not correspond to software alone, and the logic configured to receive local user input 725 relies at least in part upon hardware to achieve its functionality.

Referring to FIG. 7, while the configured logics of 705 through 725 are shown as separate or distinct blocks in FIG. 7, it will be appreciated that the hardware and/or software by which the respective configured logic performs its functionality can overlap in part. For example, any software used to facilitate the functionality of the configured logics of 705 through 725 can be stored in the non-transitory memory associated with the logic configured to store information 715, such that the configured logics of 705 through 725 each performs their functionality (i.e., in this case, software execution) based in part upon the operation of software stored by the logic configured to store information 705. Likewise, hardware that is directly associated with one of the configured logics can be borrowed or used by other configured logics from time to time. For example, the processor of the logic configured to process information 710 can format data into an appropriate format before being transmitted by the logic configured to receive and/or transmit information 705, such that the logic configured to receive and/or transmit information 705 performs its functionality (i.e., in this case, transmission of data) based in part upon the operation of hardware (i.e., the processor) associated with the logic configured to process information 710. Further, the configured logics or "logic configured to" of 705 through 725 are not limited to specific logic gates or elements, but generally refer to the ability to perform the functionality describe herein (either via hardware or a combination of hardware and software). Thus, the configured logics or "logic configured to" of 705 through 725 are not necessarily implemented as logic gates or logic elements despite sharing the word "logic". Other interactions or cooperation between the configured logics 705 through 725 will become clear to one of ordinary skill in the art from a review of the embodiments described below in more detail.

Per the current eMBMS standard, the bearers for multicast calls are set up statically or semi-statically. This means that the eMBMS bearers need to be established before the eMBMS session is started in a specific geographic area, such that the target geographical area (MBSFN area) for a particular eMBMS session is identified and the network components are connected to support the eMBMS session before the eMBMS session is initiated. Similarly, the group member list needs to be pre-provisioned or provided out-of-band with respect to the eMBMS control plane signaling, which results in a static group experience where the group membership cannot change at call setup. When group members move out of the MBSFN area during a particular eMBMS session, the eMBMS coverage does not increase and thus the group members that depart the MBSFN area for the eMBMS session may lose access to the eMBMS session. Also, if sectors in the MBSFN area are empty of group members, these sectors continue to transmit the eMBMS session, which wastes system resources.

Figure 8:
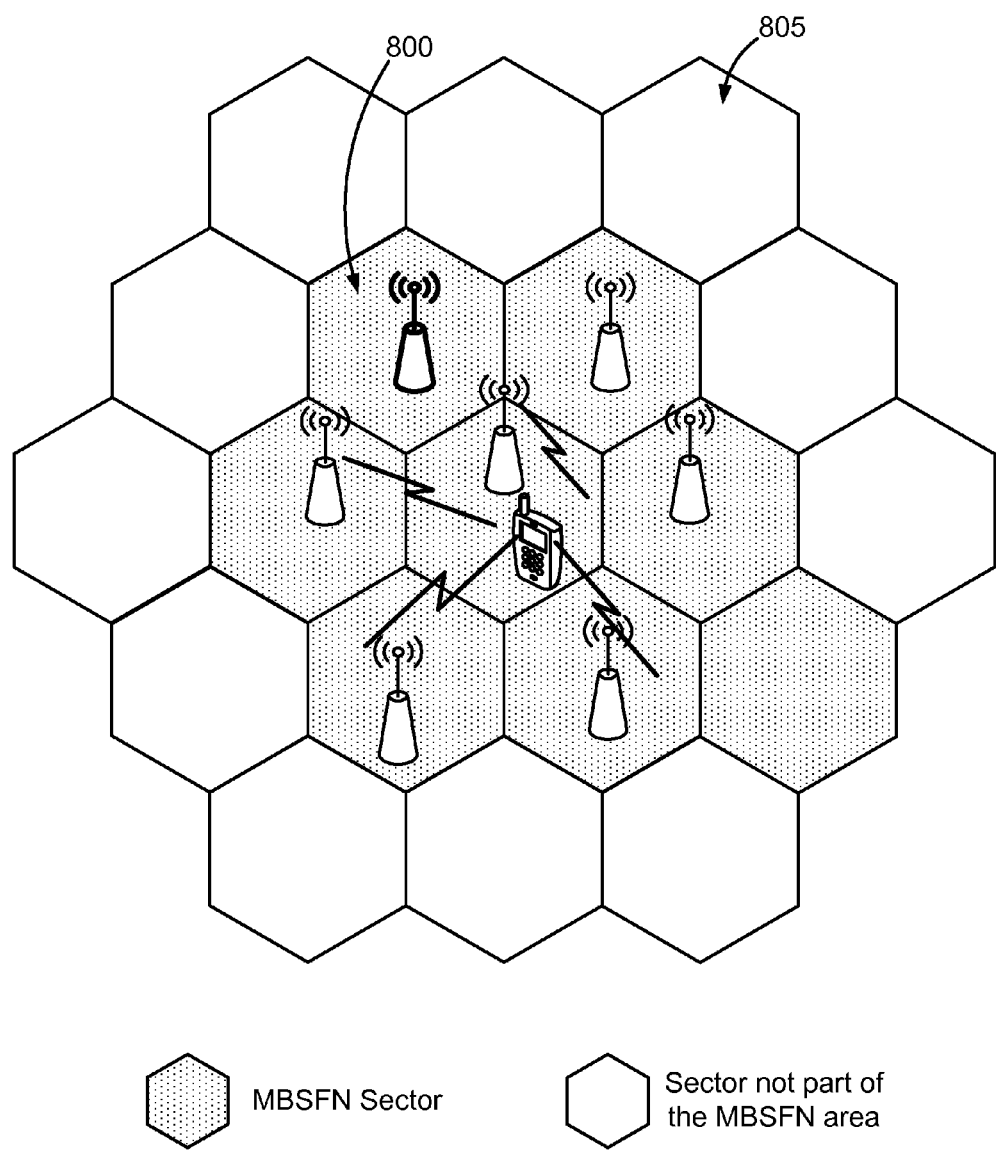
FIG. 8 illustrates a multicast/broadcast single frequency network (MBSFN) area for a particular evolved multimedia broadcast/multicast services (eMBMS) session, where sectors belonging to the MBSFN area are shown as shaded, and sectors that do not belong to the MBSFN area are shown as unshaded in accordance with an embodiment of the invention.

FIG. 8 illustrates a MBSFN area 800 for a particular eMBMS session, where sectors belonging to the MBSFN area 800 are shown as shaded, and sectors 805 that do not belong to the MBSFN area are shown as unshaded. As discussed above, when the eMBMS session is active, the MBSFN area 800 will typically transmit the eMBMS session irrespective of the movements and/or locations of individual group members, such that certain sectors within the MBSFN area 800 may be empty or include a small number of group members (e.g., such that a transition to unicast support for the eMBMS session may be more resource efficient), and certain sectors outside of the MBMS area 800 among sectors 805 may include group members that do not receive the eMBMS session media because they are outside of the static MBSFN area 800.

In EV-DO systems that support broadcast multicast services (BCMCS), BCMCS sessions can be supported based on dynamic "clustering" of sectors that attempt to track the locations of UEs in the BCMCS sessions so that the sectors carrying BCMCS media substantially map to the sectors where participating UEs are currently located. However, this approach has not been adopted in LTE. Also, this approach is typically implemented at the RAN in BCMCS (i.e., not at the application-layer), where the RAN is responsible for tracking the locations of the participating UEs in the BCMCS session.

Accordingly, embodiments are directed to an application server assisted approach to dynamic cell cluster management for eMBMS session. Unlike the BCMCS approach mentioned above, the application server (or application function (AF) in LTE terminology) arbitrating the eMBMS session is responsible for tracking the locations of the participating UEs in the eMBMS session and for dynamically updating the cluster of cells that are supporting the eMBMS session within the LTE network.

Figure 9A:
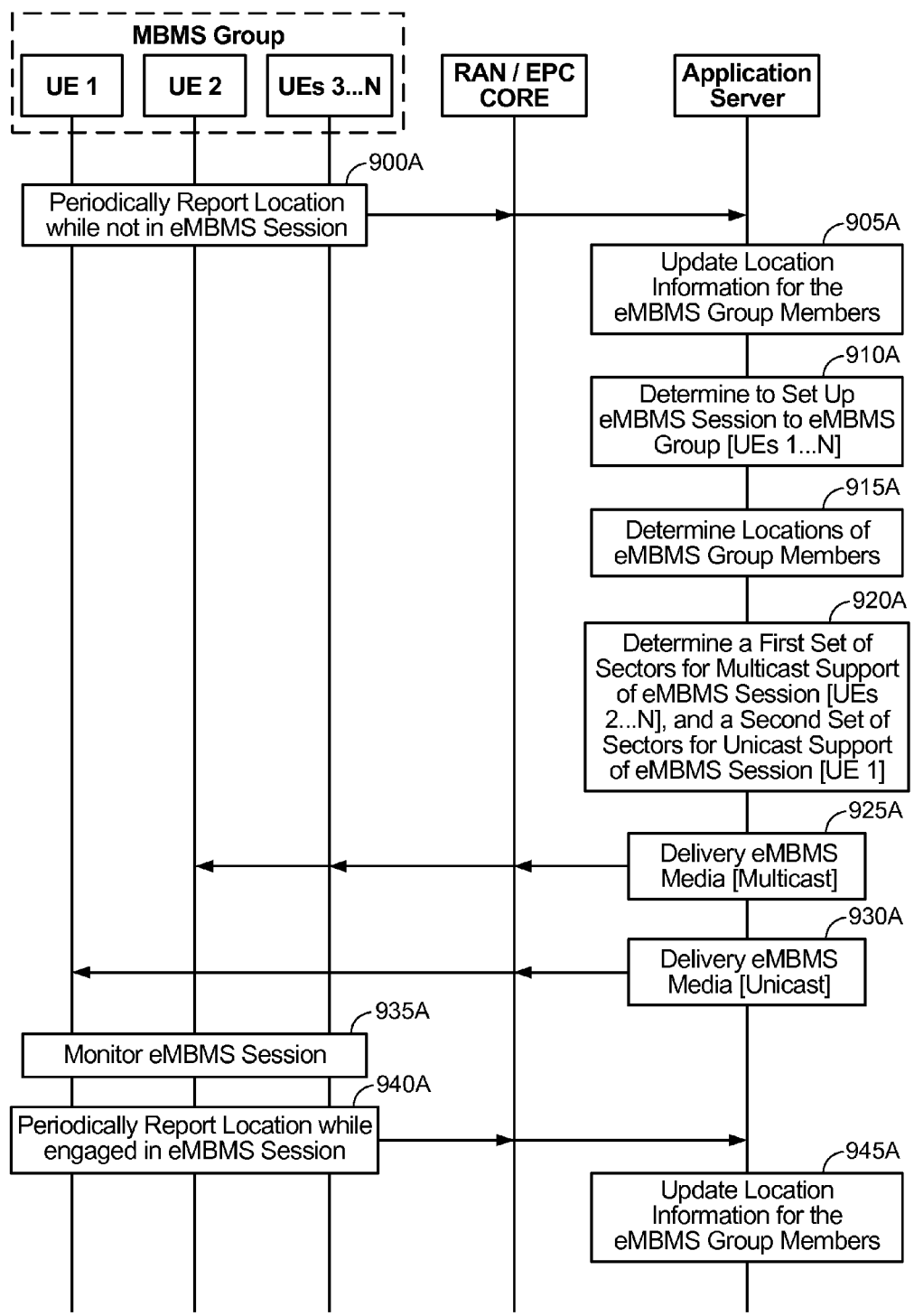
FIG. 9A illustrates a process of setting up an eMBMS session in accordance with an embodiment of the invention.

FIG. 9A illustrates a process of setting up an eMBMS session in accordance with an embodiment of the invention. At the start of FIG. 9A, assume that UEs 1 . . . N are group members belonging to a given eMBMS group and that the given eMBMS group is not actively engaged in an eMBMS session. With this assumption, UEs 1 . . . N periodically report their location to the application server so that the application server can track the locations of the group members for the given eMBMS group, 900A. The granularity of the location updates can be geographical coordinates (e.g., GPS), an indication of a current serving eNodeB, and so on. The application server receives the periodic location reports from UEs 1 . . . N and updates an eMBMS group location table maintained for the given eMBMS group with the group members' reported locations, and optionally, a time at which the group members provided the location reports, 905A. While not illustrated explicitly in FIG. 9A, the application server may remove or invalidate location entries that are too old (e.g., a few hours old, a few days old, etc.) because old location reports are unlikely to be indicative of a current location of the associated group member. Alternatively, the UE can detect the absence of MBSFN area identifier of interest to the UE in the SIB message in the current section and detect that it is out of coverage of the one or more of its MBSFN areas of interest and notify the application server regarding its out of coverage state.

At some later point in time, assume that the application server determines to setup an eMBMS session for the given eMBMS group, 910A. For example, the eMBMS session can correspond to a scheduled multimedia broadcast (e.g., a TV program), or can correspond to a user-requested call (e.g., a push-to-talk (PTT) call), and so on. The application server looks up the locations of the eMBMS group members for the given eMBMS group from the eMBMS group location table, 915A, and the application server determines a first set of sectors (e.g., the MBSFN area 800 for the eMBMS session) for multicast support of the eMBMS session and also determines a second set of sectors (e.g., UE 1's serving sector plus any associated supporting sectors) for unicast support of the eMBMS session, 920A. The set(s) of sectors (e.g., target sectors plus any associated supporting sectors for soft combining) to which eMBMS traffic is directed for transmission (via IP multicast or IP unicast) can be referred herein as the "support state" for the eMBMS session. Thus, an initial support state for the eMBMS session can be based on actual or predicted locations of the eMBMS group members at the start of the session (e.g., locations where UEs requested an initial registration to the eMBMS session, locations where the UEs last reported their location prior to eMBMS session establishment, etc.), whereas subsequent support states during the eMBMS session can change as new UEs join the session, as UEs leave the session or as UEs move to different service areas (e.g., sectors) during the session. Thus, a support state can be based upon registrations of various types, such as a "pre-registration" (e.g., an eMBMS group member reports its location to the application server before the session starts), an "initial registration" (e.g., an eMBMS group member requests registration to an announced eMBMS session for the first time) or a "location update registration" (e.g., an eMBMS group members hands off to a different sector and reports its serving sector transition in order to de-register itself from a previous sector and register with the new sector). Likewise, the support state can be based upon de-registrations of various types (e.g., the eMBMS group member can de-register itself from the eMBMS session itself, or alternatively can de-register itself from association with a particular sector when it moves to a new sector). In any case, the registrations and/or de-registrations can be conveyed to the application server via messages from the individual eMBMS group members or from the serving RAN.

In particular, at 920A, the application server determines to support UEs that are located in the MBSFN area 800 for the eMBMS session via multicast, and the application server determines to support UEs that are outside of the MBSFN area 800 via unicast. This determination can be made based on the location of the UE that was reported before the call was made, or the information from the UE reporting its presence in an area outside the MBSFN area. In the example of FIG. 9A, assume that UE 1 is outside of the MBSFN area 800, that the remaining UEs 2 . . . N are inside of the MBSFN area 800, and that at least one target UE for the eMBMS session is in each sector of the MBSFN area (i.e., "pruning" of empty sectors in the MBSFN area is discussed below with respect to FIGS. 10A-10E, whereby "empty" sectors can be interpreted as sectors with zero target UEs or alternatively as sectors with a number of target UEs below an IP multicasting threshold where IP unicasting protocols are used instead). Accordingly, the application server delivers the eMBMS session media via multicast to UEs 2 . . . N within the MBSFN area 800 by coordinating with the BM-SC 536 and mapping the appropriate downstream network components at the LTE network, 925A, and the application server delivers the eMBMS session media via unicast to UE 1 via the P-GW and S-GW (instead of the BM-SC 536), 930A. UEs 1 . . . N each monitor the eMBMS session, 935A, and UEs 1 . . . N continue to periodically report their location to the application server during the eMBMS session, 940A. The location reporting frequency at 940A need not be the same as the location reporting frequency at 900A. For example, the location reporting frequency at 940A can be higher than the location reporting frequency at 900A so that the application server can track the UEs engaged in the eMBMS session more precisely during the eMBMS session. Alternatively, the UEs 1 . . . N can only report updates when they move across the MBSFN areas or UEs can report updates that the bundled with other network report like Channel Quality Indication reports. The application server receives the periodic location reports from UEs 1 . . . N or event based reports (crossing in and out of the MBSFN area) during the eMBMS session and (if necessary) updates the eMBMS group location table maintained for the given eMBMS group with the group members' reported locations, and optionally, a time at which the group members provided the location reports, 945A.

Figure 9B:
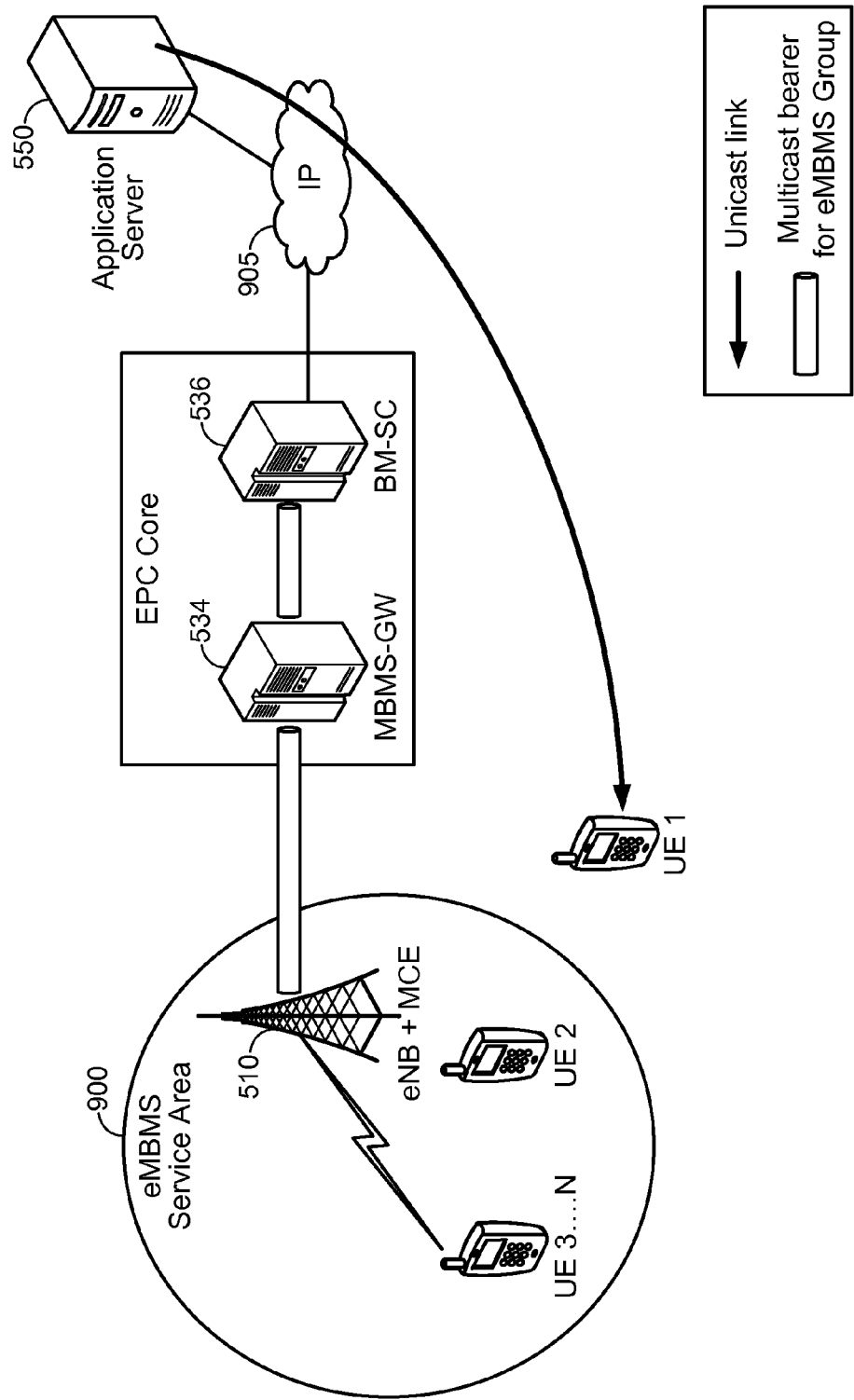
FIG. 9B illustrates an eMBMS session support state based on the MBSFN area from FIG. 8 after the eMBMS session setup procedure of FIG. 9A is executed in accordance with an embodiment of the invention.

FIG. 9B illustrates an eMBMS session support state based on the MBSFN area 800 from FIG. 8 after the eMBMS session setup procedure of FIG. 9A is executed in accordance with an embodiment of the invention. Referring to FIG. 9B, the application server 550 sends the eMBMS session media to UEs 2 . . . N within the eMBMS service area 900 (e.g., the MBSFN area 800) via multicast over an IP network 905, as in 925A. The application server 550 also sends the eMBMS session media to UE 1 outside of the eMBMS service area 900 (or the MBSFN area 800) via unicast, as in 930A. As will be appreciated, UE 1 would normally not be able to participate in the eMBMS session because eMBMS sessions are conventionally supported exclusively within their static or semi-static MBSFN areas.

Figure 9C:
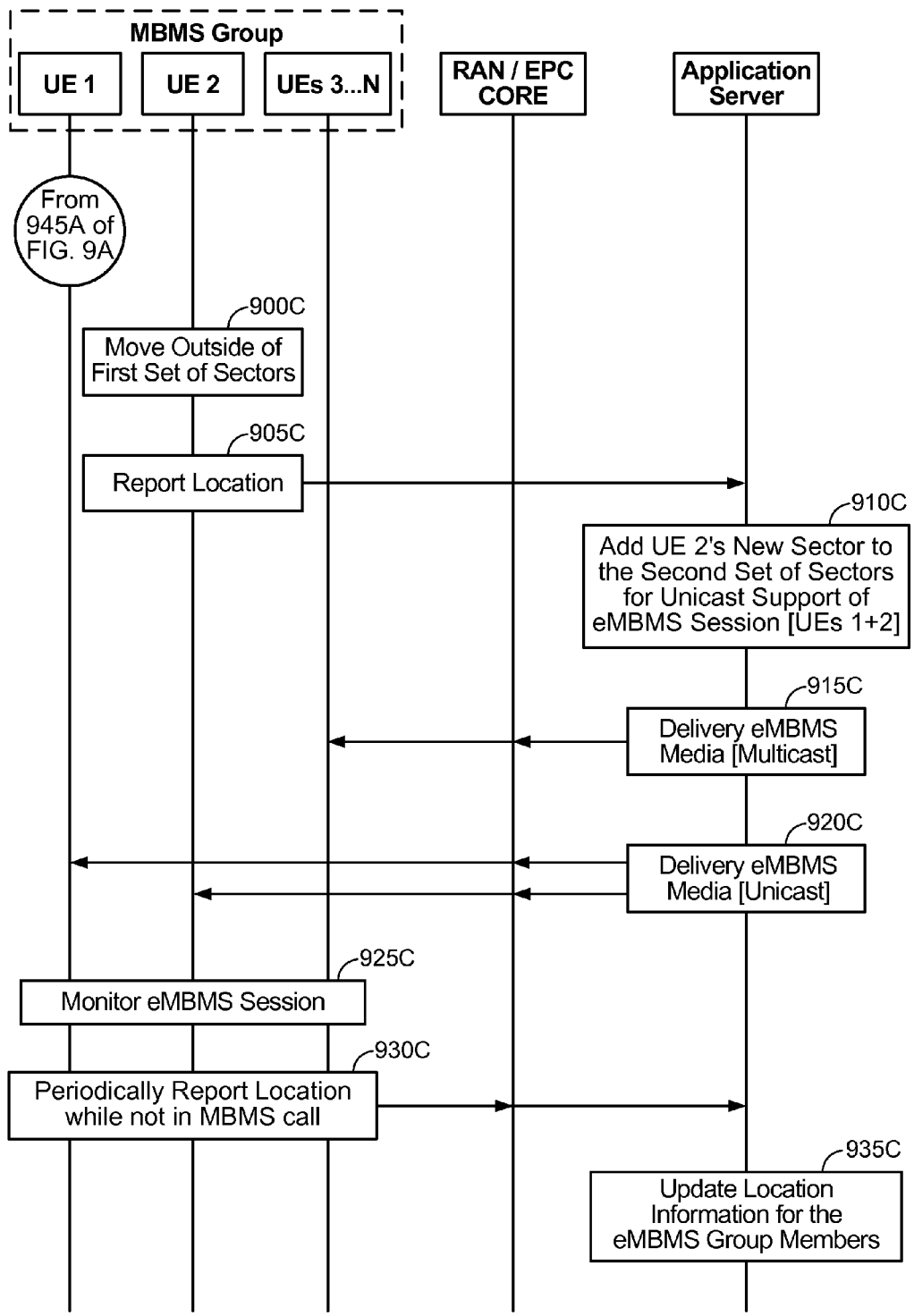
FIG. 9C illustrates a continuation of the process of FIG. 9A in accordance with an embodiment of the invention.

FIG. 9C illustrates a continuation of the process of FIG. 9A in accordance with an embodiment of the invention. Referring to FIG. 9C, assume that UE 2 exits the MBSFN area 800 during the eMBMS session, 900C. Accordingly, UE 2 provides a location report indicating that UE 2 is no longer in the MBSFN area 800, 905C. The report transmitted at 905C can occur at the next scheduled periodic location reporting interval, or alternatively can occur as soon as UE 2 detects that it has exited the MBSFN area 800. UE 2's new sector may be the same sector or a different sector from UE 1 in an example, which is also located outside of the MBSFN area 800.

The application server receives the location report from UE 2 and adds UE 2's new sector to the second set of sectors for unicast support of the eMBMS session, such that the second set of sectors is updated to include the serving sectors of UEs 1 and 2 as well as any associated supporting sectors, 910C. Accordingly, the application server continues to deliver the eMBMS session media through the BM-SC 536 via multicast to UEs 3 . . . N within the MBSFN area 800, 915C, and the application server delivers the eMBMS session media via unicast to UEs 1 and 2, 920C. UEs 1 . . . N each monitor the eMBMS session, 925C, and UEs 1 . . . N continue to periodically report their location to the application server during the eMBMS session, 930C. The application server receives the periodic location reports from UEs 1 . . . N during the eMBMS session and (if necessary) updates the eMBMS group location table maintained for the given eMBMS group with the group members' reported locations, and optionally, a time at which the group members provided the location reports, 935C.

Figure 9D:
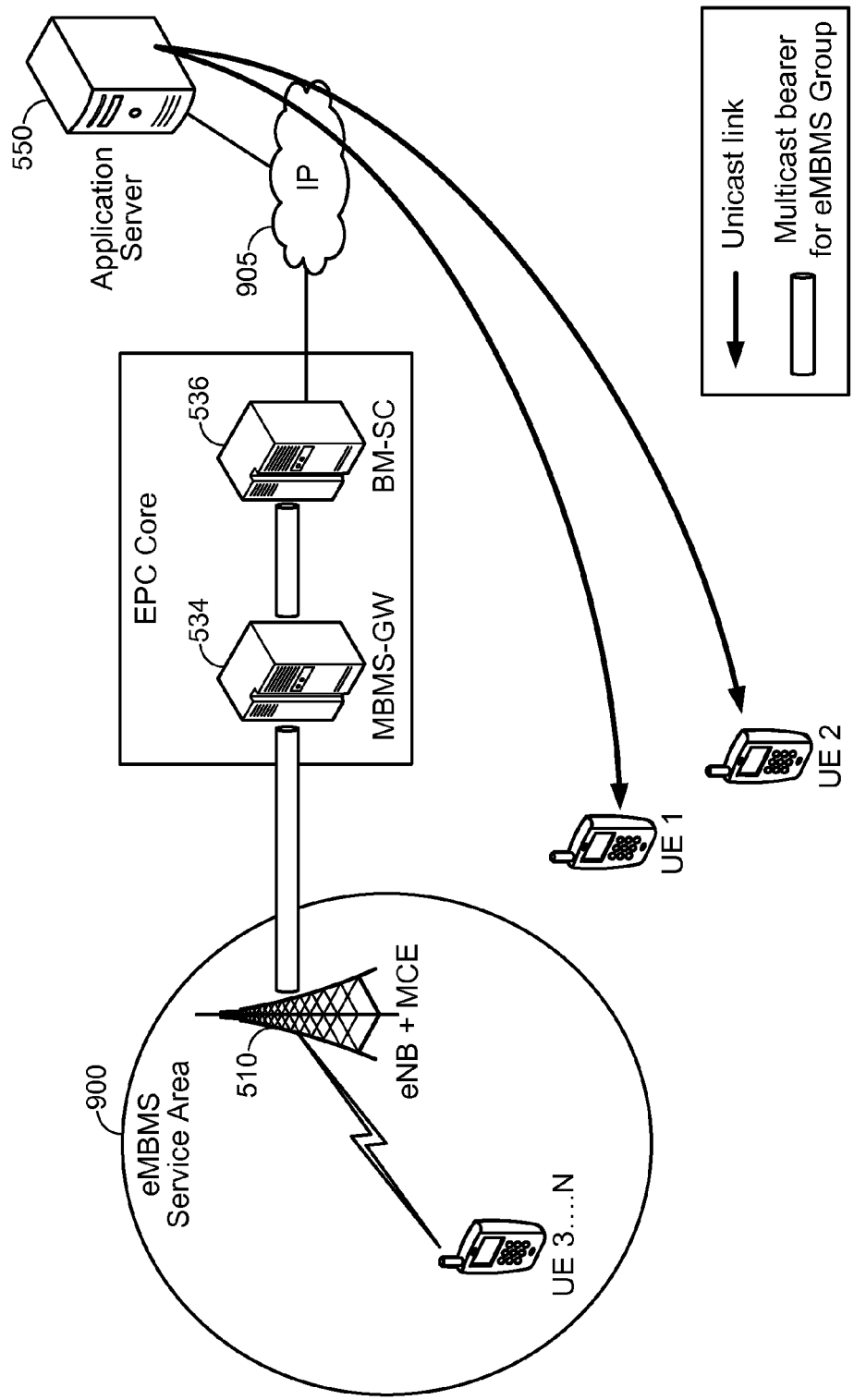
FIG. 9D illustrates an eMBMS session support state based on the MBSFN area from FIG. 8 after the process of FIG. 9C is executed in accordance with an embodiment of the invention.

FIG. 9D illustrates an eMBMS session support state based on the MBSFN area 800 from FIG. 8 after the process of FIG. 9C is executed in accordance with an embodiment of the invention. Referring to FIG. 9C, the application server 550 sends the eMBMS session media to UEs 3 . . . N within the eMBMS service area 900 (or the MBSFN area 800) via multicast over an IP network 905, as in 915C. The application server 550 also sends the eMBMS session media to UEs 1 and 2 outside of the eMBMS service area 900 (or the MBSFN area 800) via unicast, as in 920C. As will be appreciated, UEs 1 and 2 would normally not be able to participate in the eMBMS session because eMBMS sessions are conventionally supported exclusively within their static or semi-static MBSFN areas.

Figure 9E:
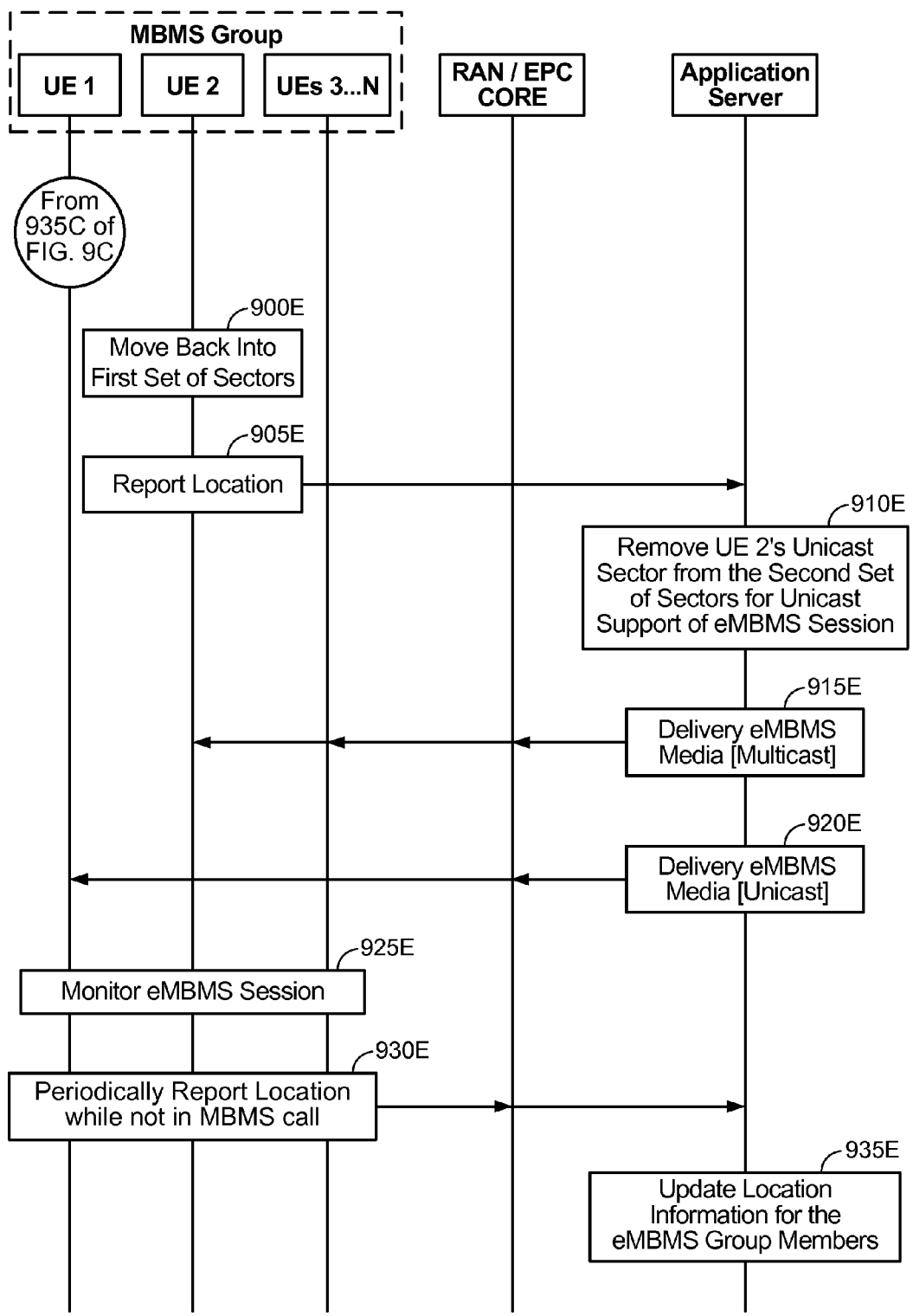
FIG. 9E illustrates a continuation of the process of FIG. 9C in accordance with an embodiment of the invention.

FIG. 9E illustrates a continuation of the process of FIG. 9C in accordance with an embodiment of the invention. Referring to FIG. 9E, assume that UE 2 re-enters the MBSFN area 800 during the eMBMS session, 900E. Accordingly, UE 2 provides a location report indicating that UE 2 is again within the MBSFN area 800, 905E. The report transmitted at 905E can occur at the next scheduled periodic location reporting interval, or alternatively can occur as soon as UE 2 detects that it has re-entered the MBSFN area 800 (or changed sectors).

The application server receives the location report from UE 2 and removes UE 2's previous unicast support sector from the second set of sectors (as well as any supporting sectors of UE 2's previous unicast support sector that are not used to support UE 1), such that the second set of sectors is updated to include the serving sector of UE 1 (but not UE 2) as well as any associated supporting sectors, 910E. Accordingly, the application server delivers the eMBMS session media via multicast to UEs 2 . . . N within the MBSFN area 800, 915E, and the application server delivers the eMBMS session media via unicast to UE 1, 920E. UEs 1 . . . N each monitor the eMBMS session, 925E, and UEs 1 . . . N continue to periodically report their location to the application server during the eMBMS session, 930E. The application server receives the periodic location reports from UEs 1 . . . N during the eMBMS session and (if necessary) updates the eMBMS group location table maintained for the given eMBMS group with the group members' reported locations, and optionally, a time at which the group members provided the location reports, 935E.

Figure 9F:
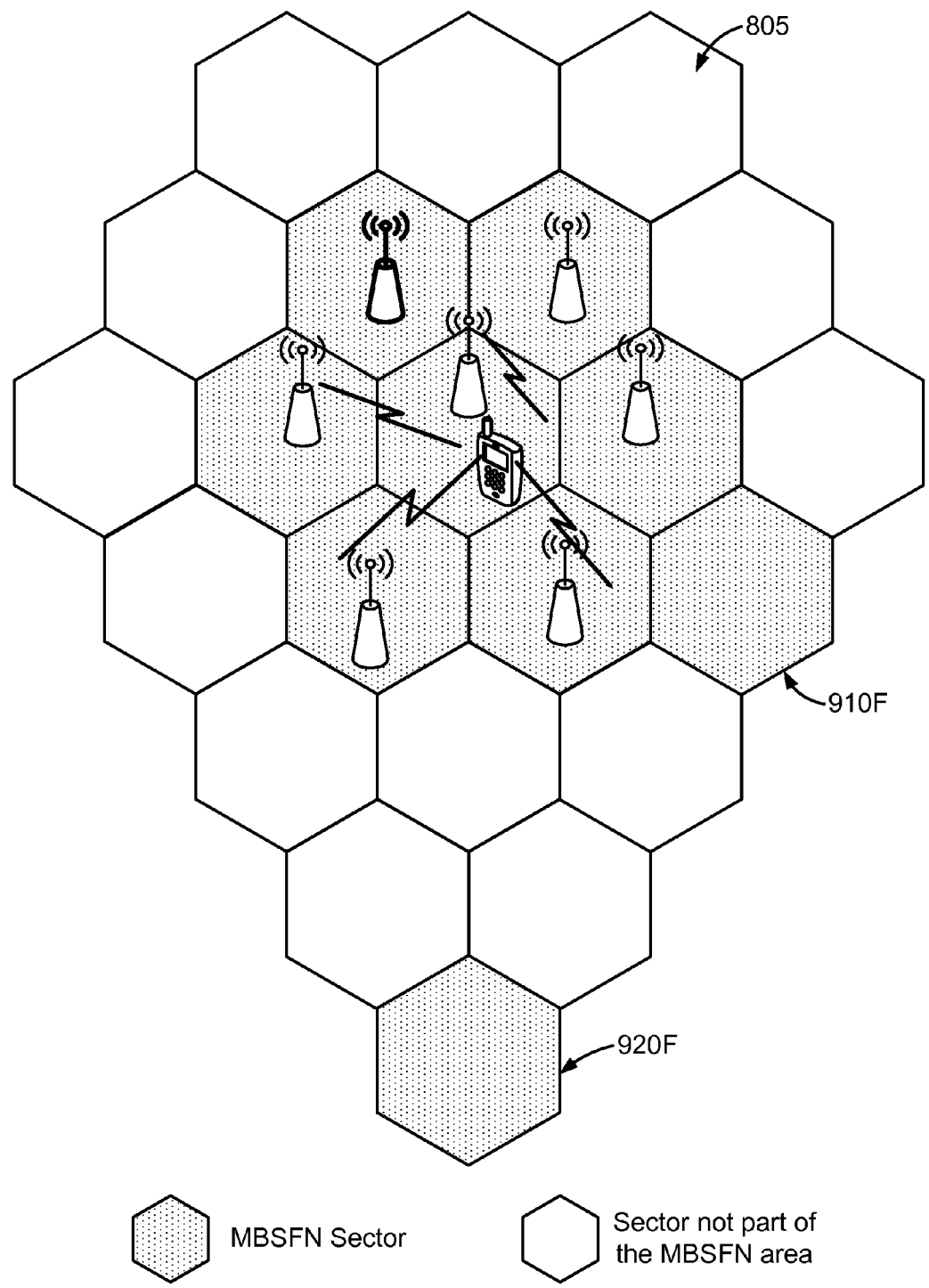
FIG. 9F illustrates an eMBMS session support state based on the MBSFN area from FIG. 8 with both contiguous and non-contiguous non-MBSFN sectors being part of an extended MBSFN area in accordance with an embodiment of the invention.

While not shown explicitly in FIGS. 9A-9E, if a "unicast" sector that is outside of and/or adjacent to eMBMS service area 900 contains a threshold number of UEs (e.g., 2, 5, 10, etc.), this sector may be transitioned into a "multicast" sector as shown in FIG. 9F. Thus, if the eMBMS service area 900 generally corresponds to MBSFN area 800 from FIG. 8, one or more non-MBFSN sectors can be merged into the eMBMS service area 900 in the sense that a contiguous set of sectors can extend out of the MBSFN area 800 into one or more contiguous non-MBSFN sectors. In this case, it will be appreciated that the adjacent (or contiguous) non-MBSFN sectors can be toggled back and forth between unicast support and multicast support for the eMBMS session as the number of target UEs in the respective sectors is changed. In FIG. 9F, assume that sector 910F was not initially part of the MBSFN service area (or MBSFN area 800), but that sector 910F was "merged" into the MBSFN service area 900 as a non-MBSFN "multicast" sector by virtue of the threshold number of UEs being detected as present therein. Also, it is understood that any supporting sectors of sector 910F of the original non-MBSFN" sector can also carry the multicast eMBMS traffic so that the MBSFN "multicast" sector can cause one or more other non-MBSFN sectors to carry the eMBMS traffic via IP multicast as well.

The non-MBSFN "multicast" sectors may also be able to benefit from soft combining with one or more sectors in the MBSFN area 800 if the one or more sectors are supporting sectors 910F of the non-MBSFN "multicast" sector. In case the "unicast" sector or a group of such adjacent sectors is not adjacent to the eMBMS service area 900, this solitary sector or a group of such adjacent sectors can be added to the group communication as another MBSFN delivering the same information as the first set of sectors. An example of such a sector is illustrated in FIG. 9F as sector 920F.

While FIGS. 9A through 9E illustrate examples by which eMBMS session support can be extended to UEs outside of a multicast support area (or eMBMS serving area or MBSFN area) of the given eMBMS session, other embodiments are directed to selectively "pruning" or excluding certain sectors within the eMBMS serving area (or MBSFN area 800) from transmitting the eMBMS session media based on UE group member movement and/or location at the start of the eMBMS session or during the eMBMS session.

Figure 10A:
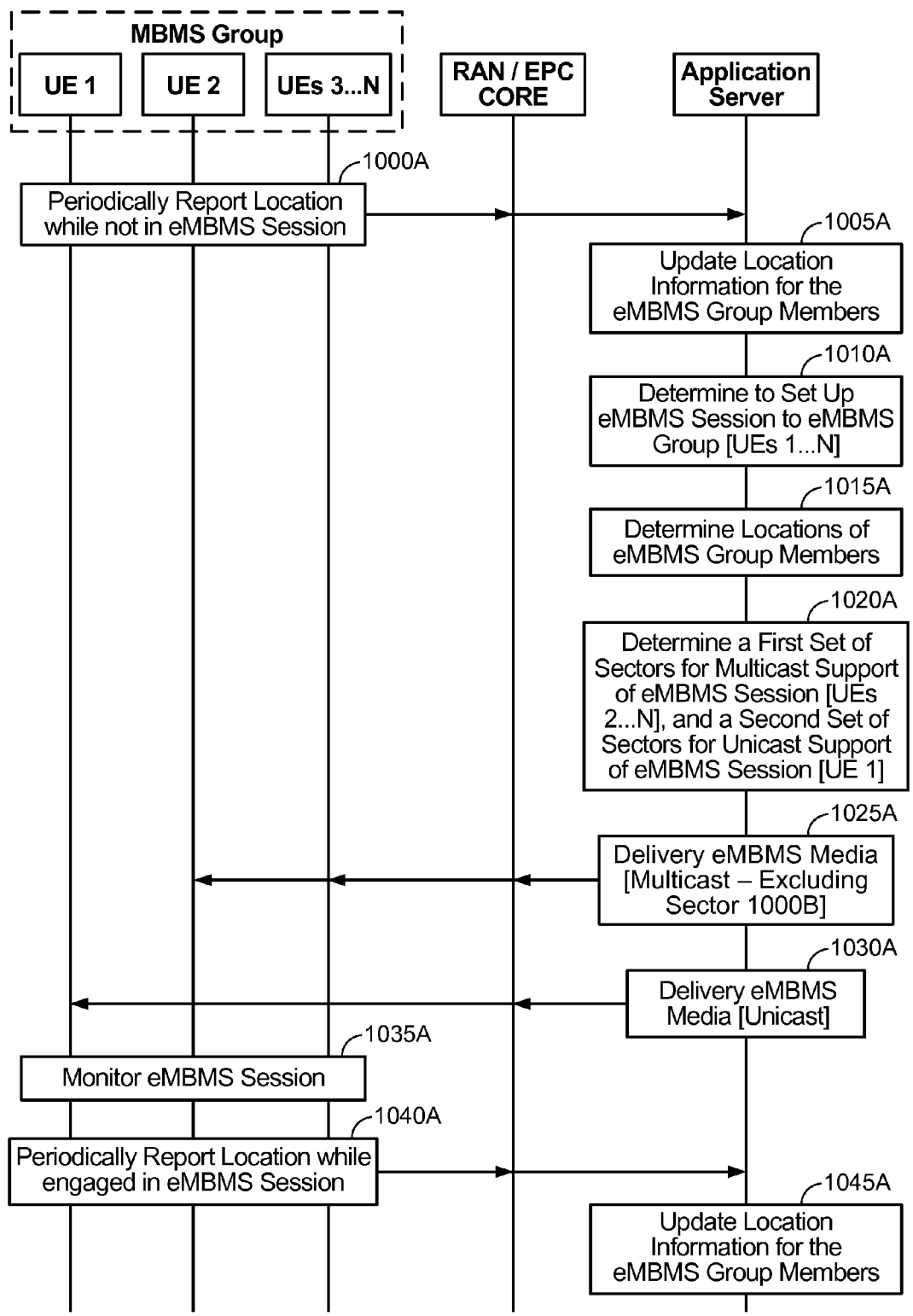
FIG. 10A illustrates another process of setting up an eMBMS session in accordance with an embodiment of the invention.
Figure 10B:
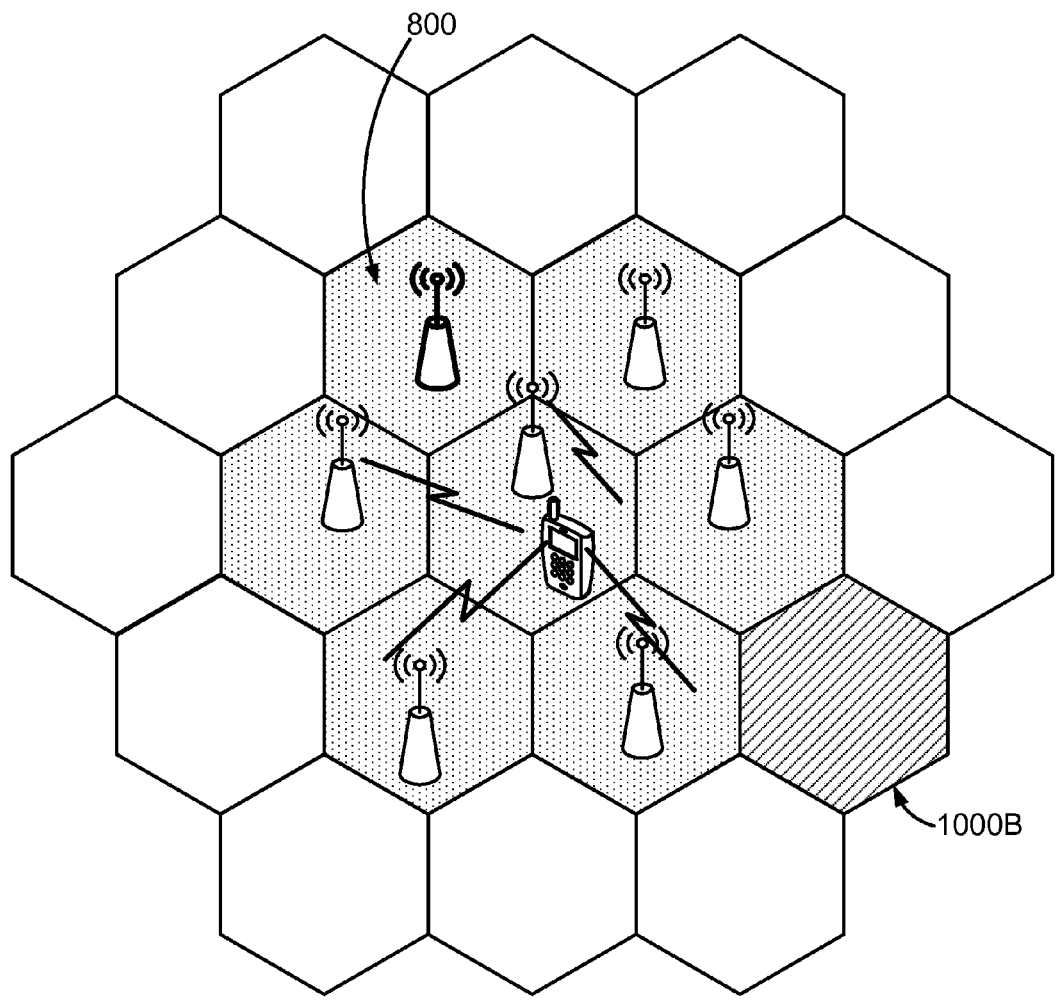
FIG. 10B illustrates a modified version of an eMBMS session support state based on the MBSFN area from FIG. 8 after the process of FIG. 10A, whereby a given sector is shown in black to designate that sector is part of the MBSFN area but is not required to transmit the eMBMS session media for the eMBMS session in accordance with an embodiment of the invention.
Figure 10B:
Figure 10B:
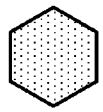
Figure 10B:
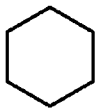

FIG. 10A illustrates another process of setting up an eMBMS session in accordance with an embodiment of the invention. 1000A through 1015A correspond to 900A through 915A of FIG. 9A, and as such will not be described further for the sake of brevity. In FIG. 9A, UEs 2 . . . N were located within the MBSFN area 800 at the beginning of the eMBMS session, while UE 1 was located outside of the MBSFN area 800. In FIG. 10A, these same assumptions may be made, but further assume that a particular sector (denoted as sector 1000B in FIG. 10B) within the MBSFN area 800 is determined by the application server to be empty of UE group members, and that sector 1000B is also not a supporting sector for the MBSFN area 800 (i.e., sector 1000B is not required to transmit the eMBMS session media to assist with soft combining in nearby sectors). FIG. 10B illustrates a modified version of an eMBMS session support state based on the MBSFN area 800 from FIG. 8 after the process of FIG. 10A, whereby sector 1000B is shown in black to designate that sector 1000B is part of the MBSFN area 800 but is not required to transmit the eMBMS session media for the eMBMS session. While not shown in FIG. 10B, one or more supporting sectors of sector 1000B can stop transmitting the eMBMS session media based on the transition of sector 1000B to a non-target sector, so long as the one or more supporting sectors of sector 1000B are not target sectors and/or supporting sectors of another current target sector.

Thereby, at 1020A, similar to 920A of FIG. 9A, the application server determines to support UEs 2 . . . N in the MBSFN area 800 for the eMBMS session via multicast, and the application server determines to support UE 1 outside of the MBSFN area 800 via unicast. However, the application server 150 coordinates with the BM-SC 536 so that sector 1000B is excluded from the eMBMS cluster (as well as any supporting sectors that were supporting sector 1000B and are no longer needed to support any target sectors in the MBSFN area 800 after sector 1000B's exclusion) and will not transmit the eMBMS session media. Accordingly, the application server delivers the eMBMS session media via multicast to UEs 2 . . . N within the MBSFN area 800 (except for sector 1000B), 1025A, and the application server delivers the eMBMS session media via unicast to UE 1, 1030A. UEs 1 . . . N each monitor the eMBMS session, 1035A (e.g., similar to 935A of FIG. 9A), and UEs 1 . . . N continue to periodically report their location to the application server during the eMBMS session, 1040A (e.g., similar to 940A of FIG. 9A). The application server receives the periodic location reports from UEs 1 . . . N during the eMBMS session and (if necessary) updates the eMBMS group location table maintained for the given eMBMS group with the group members' reported locations, and optionally, a time at which the group members provided the location reports, 1045A (e.g., similar to 945A of FIG. 9A).

Figure 10C:
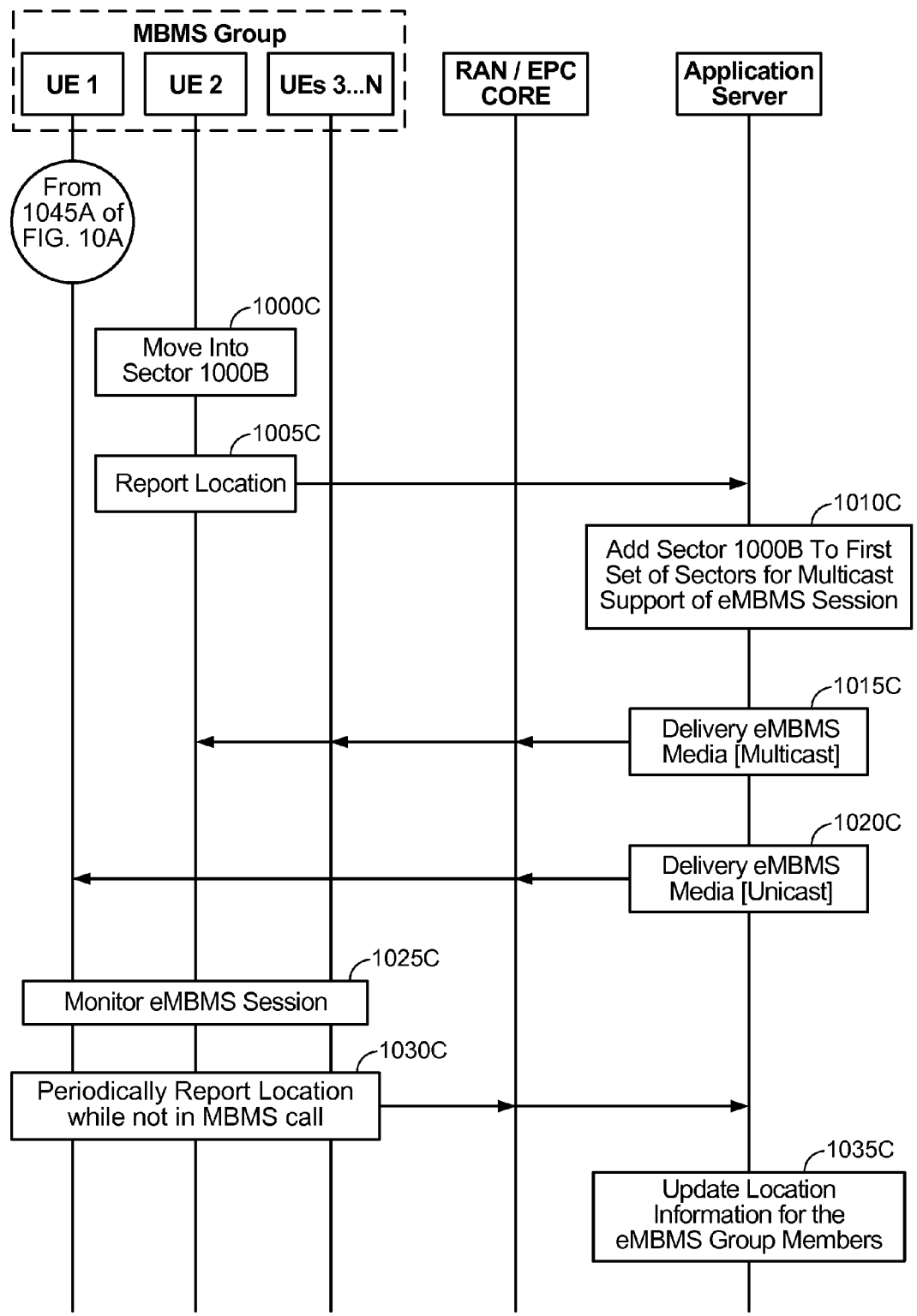
FIG. 10C illustrates a continuation of the process of FIG. 10A in accordance with an embodiment of the invention.

FIG. 10C illustrates a continuation of the process of FIG. 10A in accordance with an embodiment of the invention. Referring to FIG. 10C, assume that UE 2 moves into sector 1000B within the MBSFN area 800 during the eMBMS session, 1000C. Accordingly, UE 2 provides a location report indicating that UE 2 has moved into sector 1000B, 1005C. The report transmitted at 1005C can occur at the next scheduled periodic location reporting interval, or alternatively can occur as soon as UE 2 detects that it has entered a new sector (i.e., sector 1000B).

The application server receives the location reports from UE 2 and on the account of UE 2 crossing its threshold to perform IP multicast instructs the BMSC to add sector 1000B (which was previously "pruned" or removed from the eMBMS multicast support region for the eMBMS session) to the first set of sectors for multicast support of the eMBMS session, 1010C, along with any supporting sectors of sector 1000B that are not yet transmitting the eMBMS session media via multicast. Accordingly, the application server delivers the eMBMS session media via multicast to UEs 2 . . . N within the MBSFN area 800 (including sector 1000B), 1015B, and the application server delivers the eMBMS session media via unicast to UE 1, 1020C. UEs 1 . . . N each monitor the eMBMS session, 1025C, and UEs 1 . . . N continue to periodically report their location to the application server during the eMBMS session, 1030C. The application server receives the periodic location reports from UEs 1 . . . N during the eMBMS session and (if necessary) updates the eMBMS group location table maintained for the given eMBMS group with the group members' reported locations, and optionally, a time at which the group members provided the location reports, 1035C. After the process of FIG. 10C, the eMBMS session support state corresponds to FIG. 8, since the entire MBSFN area 800 is carrying the eMBMS session (i.e., no pruned sectors since sector 1000B is no longer empty).

Figure 10D:
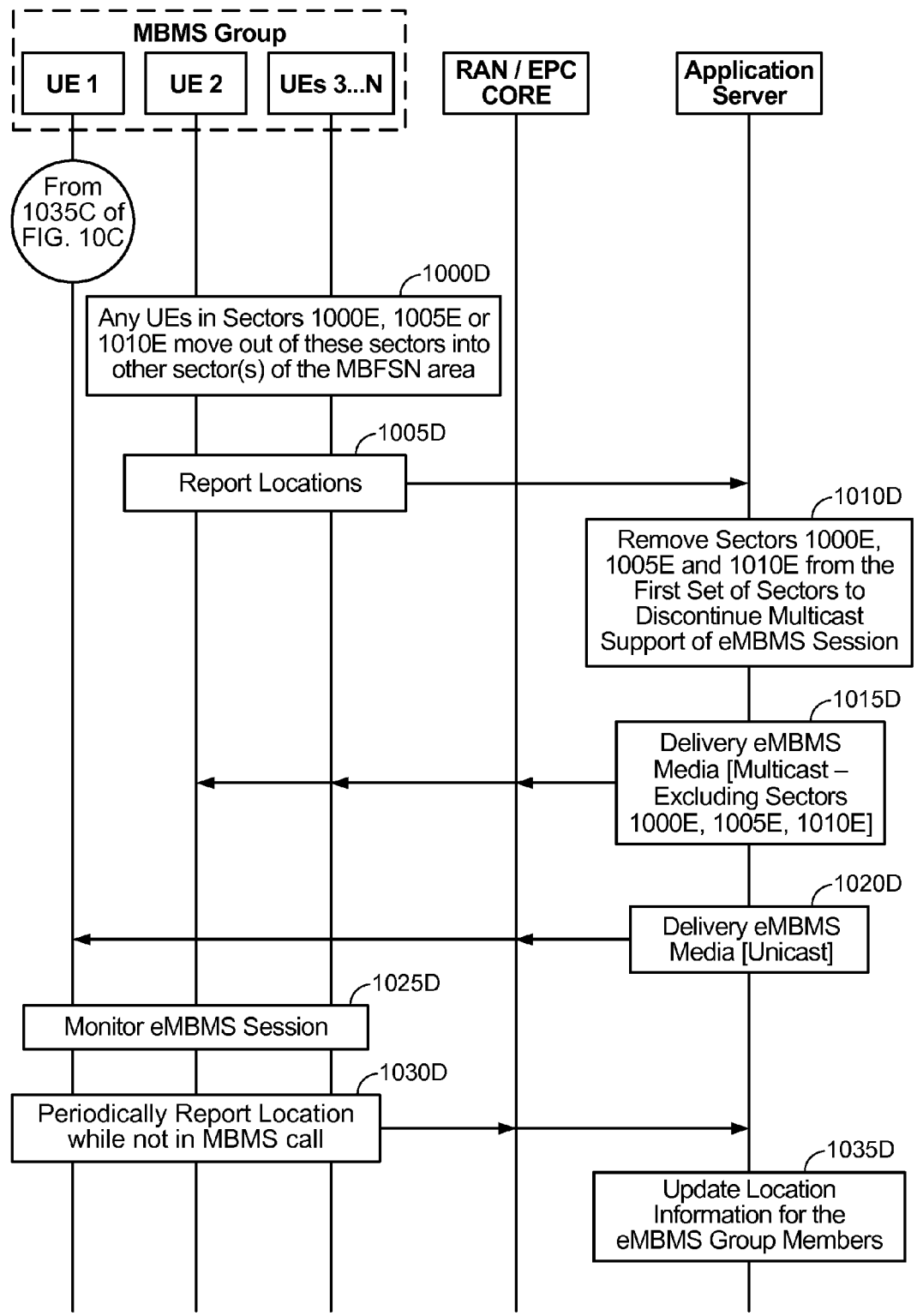
FIG. 10D illustrates a continuation of the process of FIG. 10C in accordance with an embodiment of the invention.
Figure 10E:
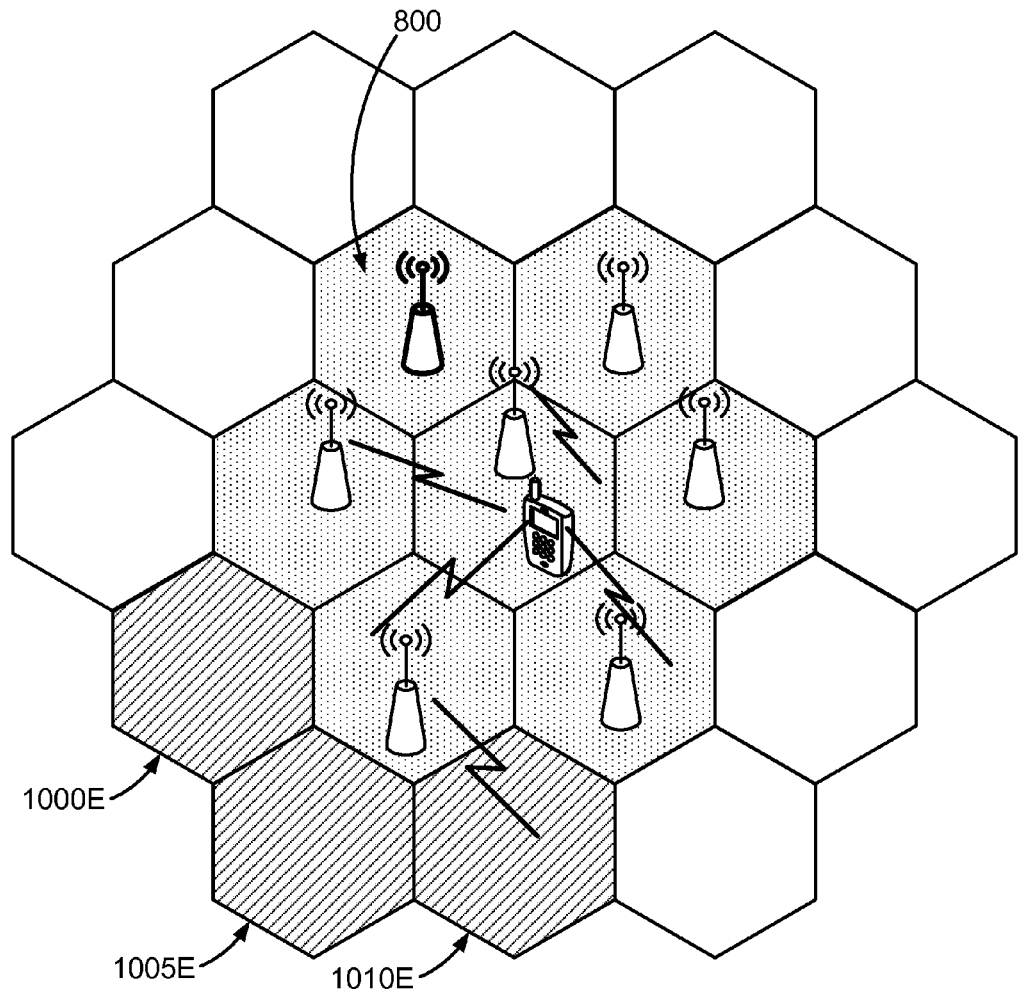
FIG. 10E illustrates another modified version of an eMBMS session support state based on the MBSFN area from FIG. 8 after the process of FIG. 10D, whereby a given sector is shown in black to designate that sector is part of the MBSFN area but is not required to transmit the eMBMS session media for the eMBMS session in accordance with an embodiment of the invention.
Figure 10E:
Figure 10E:
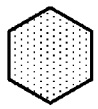
Figure 10E:
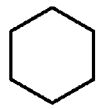

FIG. 10D illustrates a continuation of the process of FIG. 10C in accordance with an embodiment of the invention. Referring to FIG. 10D, assume that any UEs in the MBSFN area 800 that are located in sectors 1000E, 1005E or 1010E (shown in FIG. 10E) move to different sectors within the MBSFN area 800 during the eMBMS session, leaving sectors 1000E, 1005E and 1010E empty, 1000D. It may be further assumed in FIG. 10D that sectors 1000E, 1005E and 1010E are also not supporting any other sectors in the MBSFN area 800 as supporting sectors for soft combining. Alternatively, these UEs can simply drop out of (or exit) the eMBMS session, but in any case sectors 1000E, 1005E and 1010E are empty after 1000D The eMBMS session state is shown in FIG. 8E based on the MBSFN area 800 from FIG. 8, whereby sectors 1000E, 1005E and 1010E are shown in black to denote their empty status. Accordingly, the UEs that leave sectors 1000E, 1005E and/or 1010E provide location reports indicating that their new sectors, which functions to notify the application server that sectors 1000E, 1005E and 1010E are empty, 1005D. The reports transmitted at 1005D can occur at the next scheduled periodic location reporting interval at the respective UEs, or alternatively can occur as soon as the UEs leave their respective sectors (i.e., sectors 1000E, 1005E and 1010E). Also, the reports transmitted at 1005D are not necessarily received contemporaneously, but can be spaced apart.

The application server receives the location report from the UEs in 1005D and removes or "prunes" sectors 1000E, 1005E and 1010E (which were previously part of the eMBMS multicast support region for the eMBMS session) from the first set of sectors in order to discontinue multicast support of the eMBMS session, 1010D, along with any supporting sectors of sectors 1000E, 1005E and 1010E that are no longer required to carry the eMBMS session media via multicast for supporting target UEs in sectors 1000E, 1005E and 1010E. In an example, the application server may decide to prune sectors 1000E, 1005E and 1010E from the eMBMS cluster after these sectors are empty for a threshold period of time (e.g., 2 minutes, etc.) so that UEs ping-ponging between these sectors and other sectors will not suddenly lose eMBMS service upon a return to these sectors. Accordingly, the application server coordinates with the BM-SC 536 to deliver the eMBMS session media via multicast to UEs 2 . . . N within the MBSFN area 800 (while excluding sectors 1000E, 1005E and 1010E), 1015D, and the application server delivers the eMBMS session media via unicast to UE 1, 1020D. UEs 1 . . . N each monitor the eMBMS session, 1025D, and UEs 1 . . . N continue to periodically report their location to the application server during the eMBMS session, 1030D. The application server receives the periodic location reports from UEs 1 . . . N during the eMBMS session and (if necessary) updates the eMBMS group location table maintained for the given eMBMS group with the group members' reported locations, and optionally, a time at which the group members provided the location reports, 1035D. After the process of FIG. 10D, the eMBMS session support state corresponds to FIG. 10E, with sectors 1000E, 1005E and 1010E being "pruned" (i.e., excluded from carrying eMBMS session media within the MBSFN area 800).

While FIGS. 10A-10E describe sectors that are "empty" of target UEs as being candidate sectors for pruning from the eMBMS cluster, it will be appreciated that the pruning trigger can instead simply be in response to the number of target UEs in a particular sector of the MBSFN area 800 falling below a threshold number. Thus, an "empty" target sector does not necessarily imply zero target UEs, but could instead correspond to a multicast to unicast transition threshold (e.g., if the number of target UEs falls below the threshold, switch to unicast support for any remaining UEs instead of dropping support altogether, or if the number of target UEs rises above the threshold, switch from unicast support to multicast support in that sector).

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for group communications over evolved multimedia broadcast/multicast services (eMBMS). Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a server that is external to a core network and configured to arbitrate a group communication session for transmission of session media to a multicast group being served by the core network, comprising:
  determining, by the server that is external to the core network, a first support state for the group communication session based on one or more UE registrations to the group communication session and/or one or more UE de-registrations from the group communication session, the first support state defining a first set of sectors belonging to a multicast/broadcast single frequency network (MBSFN) area for transmission of the session media for the group communication session via Internet Protocol (IP) multicast;
  delivering, by the server that is external to the core network, the session media for the group communication session to the first set of sectors via IP multicast in accordance with the first support state;
  transitioning, by the server that is external to the core network, the group communication session from the first support state to a second support state based on one or more additional UE registrations to the group communication session and/or one or more additional UE de-registrations from the group communication session, the second support state defining a second set of sectors belonging to the MBSFN area for transmission of the session media for the group communication session via IP multicast, wherein the first set of sectors is different from the second set of sectors; and
  delivering, by the server that is external to the core network after the transition, the session media for the group communication session to the second set of sectors via IP multicast in accordance with the second support state.

2. The method of claim 1, wherein the first support state defines the first set of sectors and also defines a supplemental set of sectors outside of the MBSFN area for transmission of the session media for the group communication session.

3. The method of claim 2, wherein the delivering of the session media to the first set of sectors includes:

selecting IP multicast as a first media delivery protocol for the delivery of the session media to the first set of sectors, and selecting IP unicast as a second media delivery protocol for delivery of the session media to the supplemental set of sectors.

4. The method of claim 1, wherein the second support state defines the second set of sectors and also defines a supplemental set of sectors outside of the MBSFN area for transmission of the session media for the group communication session.

5. The method of claim 4, wherein the delivering of the session media to the second set of sectors includes:

selecting IP multicast as a first media delivery protocol for the delivery of the session media to the second set of sectors, and selecting IP unicast as a second media delivery protocol for delivery of the session media to the supplemental set of sectors.

6. The method of claim 1, wherein the transitioning includes:

receiving a registration for the group communication session from a given UE within a given sector that is not recognized by the first support state as including a threshold number of UEs being registered to the group communication session, detecting that the received registration indicates that the threshold number of UEs is satisfied for the given sector, and forming the second set of sectors by adding one or more sectors to the first set of sectors based on the detection.

7. The method of claim 6, wherein the one or more sectors are inside the MBSFN area.

8. The method of claim 6, wherein the one or more sectors are outside of the MBSFN area and are either contiguous with and adjacent to at least one sector in the first set of sectors or are not contiguous and adjacent to any sector in the first set of sectors.

9. The method of claim 6, wherein the one or more added sectors include the given sector and any sectors configured to support soft combining with the given sector that are not already among the first set of sectors.

10. The method of claim 6, wherein the received registration is received upon entry of the given UE into the given sector of the MBSFN area from another sector outside of the MBSFN area, wherein the given UE was previously participating in the group communication session from the other sector via IP unicast prior to the entry of the given UE into the given sector of the MBSFN area, and wherein the transitioning stops supporting the given UE via IP unicast and begins to support the given UE via IP multicast within the given sector of the MBSFN area.

11. The method of claim 6, wherein the received registration is received upon entry of the given UE into the given sector of the MBSFN area from another sector of the MBSFN area, wherein the given UE was previously participating in the group communication session from the other sector via IP multicast prior to the entry of the given UE into the given sector of the MBSFN area, wherein the transitioning interprets the received registration as a de-registration of the given UE from the other sector.

12. The method of claim 11, wherein the other sector is recognized by the first support state as including a threshold number of UEs being registered to the group communication session, wherein the transitioning further includes:

supplementally detecting that the de-registration indicates that the threshold number of UEs is no longer satisfied for the other sector, and forming the second set of sectors by removing, from the first set of sectors, at least one sector based on the detection.

13. The method of claim 12, wherein the at least one removed sector includes the other sector and any sectors configured to support soft combining with the other sector that do not include the threshold number of UEs being registered to the group communication session and do not support soft combining with any sectors that include the threshold number of UEs being registered to the group communication session.

14. The method of claim 1, wherein the transitioning includes:

receiving a de-registration for the group communication session from a given UE within a given sector of the MBSFN area that is recognized by the first support state as including a threshold number of UEs being registered to the group communication session, and detecting that the received de-registration indicates that the threshold number of UEs is no longer satisfied for the given sector, and forming the second set of sectors by removing, from the first set of sectors, one or more sectors based on the detection.

15. The method of claim 14, wherein the one or more removed sectors include the given sector and any sectors configured to support soft combining with the given sector that do not include the threshold number of UEs being registered to the group communication session and do not support soft combining with any sectors that include the threshold number of UEs being registered to the group communication session.

16. The method of claim 1, further comprising:

receiving a registration for the group communication session from a given UE within a given sector that is outside of the MBSFN area.

17. The method of claim 16, further comprising:

delivering the session media to the given UE within the given sector via IP unicast in response to the received registration.

18. The method of claim 17, further comprising:

receiving a de-registration for the group communication session from the given UE within the given sector; and stopping delivery of the session media to the given UE within the given sector via IP unicast in response to the received de-registration.

19. The method of claim 16, further comprising:

detecting that the received registration indicates a threshold number of UEs is now registered to the group communication session within the given sector; and switching support for the group communication session within the given sector from IP unicast to IP multicast in response to the detection.

20. The method of claim 19, wherein the given sector is adjacent to and contiguous with at least one sector in the first set of sectors, further comprising:

delivering the session media to the given UE within the given sector via IP multicast such that UEs handing off between the first set of sectors and the given sector are allocated continuously support via IP multicast for the group communication session.

21. The method of claim 19, wherein the given sector is not adjacent to and contiguous with any sector in the first set of sectors.

22. The method of claim 19, further comprising:
receiving a de-registration for the group communication session from the given UE within the given sector;
detecting that the received de-registration indicates the threshold number of UEs is no longer registered to the group communication session within the given sector; and
switching support for the group communication session within the given sector from IP multicast to IP unicast for any UEs that remain registered within the given sector in response to the received de-registration.

23. The method of claim 1, wherein the one or more UE registrations and/or the one or more additional UE registrations to the group communication session include one or more initial registration requests from one or more UEs that are newly joining the group communication session and/or one or more location update messages identifying current serving sectors for at least one UE that has already joined the group communication session.

24. The method of claim 1, wherein the one or more UE de-registrations and/or the one or more additional UE de-registrations to the group communication session include one or more exit notifications from one or more UEs that are exiting the group communication session altogether and/or one or more transfer notifications indicating that at least one UE is de-registering from a previous sector in order to continue participation in the group communication session within a new sector.

25. The method of claim 1, wherein the group communication session is an Evolved Multimedia Broadcast/Multicast Services (eMBMS) session.

26. The method of claim 1, further comprising:
identifying at least one sector within the MBSFN area that includes less than a threshold number of UEs registered to the group communication session; and
supporting any UEs within the at least one identified sector via IP unicast instead of IP multicast while a number of registered UEs in the at least one identified sector continues to be less than the threshold number of UEs.

27. A server that is external to a core network and configured to arbitrate a group communication session for transmission of session media to a multicast group being served by the core network, comprising:
means for determining a first support state for the group communication session based on one or more UE registrations to the group communication session and/or one or more UE de-registrations from the group communication session, the first support state defining a first set of sectors belonging to a multicast/broadcast single frequency network (MBSFN) area for transmission of the session media for the group communication session via Internet Protocol (IP) multicast;
means for delivering the session media for the group communication session to the first set of sectors via IP multicast in accordance with the first support state;
means for transitioning the group communication session from the first support state to a second support state based on one or more additional UE registrations to the group communication session and/or one or more additional UE de-registrations from the group communication session, the second support state defining a second set of sectors belonging to the MBSFN area for transmission of the session media for the group communication session via IP multicast, wherein the first set of sectors is different from the second set of sectors; and
means for delivering, after the transition, the session media for the group communication session to the second set of sectors via IP multicast in accordance with the second support state.

28. A server that is external to a core network and configured to arbitrate a group communication session for transmission of session media to a multicast group being served by the core network, comprising:
a processor and memory configured to:
determine a first support state for the group communication session based on one or more UE registrations to the group communication session and/or one or more UE de-registrations from the group communication session, the first support state defining a first set of sectors belonging to a multicast/broadcast single frequency network (MBSFN) area for transmission of the session media for the group communication session via Internet Protocol (IP) multicast;
deliver the session media for the group communication session to the first set of sectors via IP multicast in accordance with the first support state;
transition the group communication session from the first support state to a second support state based on one or more additional UE registrations to the group communication session and/or one or more additional UE de-registrations from the group communication session, the second support state defining a second set of sectors belonging to the MBSFN area for transmission of the session media for the group communication session via IP multicast, wherein the first set of sectors is different from the second set of sectors; and
deliver, after the transition, the session media for the group communication session to the second set of sectors via IP multicast in accordance with the second support state.

29. A non-transitory computer-readable medium containing instructions stored thereon, which, when executed by a server that is external to a core network and configured to arbitrate a group communication session for transmission of session media to a multicast group being served by the core network, cause the server to perform operations, the instructions comprising:
at least one instruction to cause the server to determine a first support state for the group communication session based on one or more UE registrations to the group communication session and/or one or more UE de-registrations from the group communication session, the first support state defining a first set of sectors belonging to a multicast/broadcast single frequency network (MBSFN) area for transmission of the session media for the group communication session via Internet Protocol (IP) multicast;
at least one instruction to cause the server to deliver the session media for the group communication session to the first set of sectors via IP multicast in accordance with the first support state;
at least one instruction to cause the server to transition the group communication session from the first support state to a second support state based on one or more additional UE registrations to the group communication session and/or one or more additional UE de-registrations from the group communication session, the second support state defining a second set of sectors belonging to the MBSFN area for transmission of the session media for the group communication session via IP multicast, wherein the first set of sectors is different from the second set of sectors; and at least one instruction to cause the server to deliver, after the transition, the session media for the group communication session to the second set of sectors via IP multicast in accordance with the second support state.

* * * * *